(12) United States Patent
Bandy et al.

(10) Patent No.: US 11,182,854 B2
(45) Date of Patent: Nov. 23, 2021

(54) FACILITATION OF DETERMINISTIC INTERACTION WITH A DYNAMICALLY CHANGING TRANSACTION PROCESSING ENVIRONMENT

(71) Applicant: Chicago Mercantile Exchange Inc., Chicago, IL (US)

(72) Inventors: Nicholas Bandy, London (GB); Matthew Morano, Tenafly, NJ (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 374 days.

(21) Appl. No.: 16/128,713

(22) Filed: Sep. 12, 2018

(65) Prior Publication Data

US 2019/0012739 A1 Jan. 10, 2019

Related U.S. Application Data

(63) Continuation of application No. 14/801,417, filed on Jul. 16, 2015, now Pat. No. 10,102,579.

(51) Int. Cl.
*G06Q 40/04* (2012.01)
*H04L 29/06* (2006.01)

(52) U.S. Cl.
CPC .............. *G06Q 40/04* (2013.01); *H04L 67/42* (2013.01)

(58) Field of Classification Search
CPC .................................................... G06Q 40/04
USPC ........................................................ 705/37
See application file for complete search history.

(56) References Cited

U.S. PATENT DOCUMENTS

| 5,297,031 | A  | 3/1994 | Gutterman et al. |
| 6,408,282 | B1 | 6/2002 | Buist |
| 6,766,304 | B2 | 7/2004 | Kemp, II et al. |
| 6,772,132 | B1 | 8/2004 | Kemp, II et al. |
| 6,938,011 | B1 | 8/2005 | Kemp, II et al. |
| 6,993,504 | B1 | 1/2006 | Friesen et al. |

(Continued)

FOREIGN PATENT DOCUMENTS

| WO | 2006051293 A1 | 5/2006 |
| WO | 2009114489 A1 | 9/2009 |

OTHER PUBLICATIONS

Extended European Search Report, from EP Application No. 16179763.4, dated Oct. 27, 2016, EP.

*Primary Examiner* — Lindsay M Maguire
(74) *Attorney, Agent, or Firm* — Lempia Summerfield Katz LLC

(57) ABSTRACT

The disclosed embodiments relate to ensuring that a selected value, selected, for example, via interaction with a graphic user interface, of a dynamically changing parameter, such as a price, is used when generating an electronic data transaction request message in a data transaction processing system, such as an electronic trading system. The data transaction processing system being a system in which data items, such as financial contracts, e.g. futures contracts, are transacted or otherwise traded by a hardware matching processor that attempts to match electronic data transaction request messages with electronic data transaction request messages counter thereto for the same one of the data items based on multiple transaction parameters. A selected value is temporarily buffered allowing the represented value to update wherein a subsequently generated transaction may be based on the buffered value rather than an updated value.

21 Claims, 12 Drawing Sheets

(56) References Cited

U.S. PATENT DOCUMENTS

| | | |
|---|---|---|
| 7,113,924 B2 | 9/2006 | Fishbain |
| 7,124,110 B1 | 10/2006 | Kemp, II et al. |
| 7,127,424 B2 | 10/2006 | Kemp, II et al. |
| 7,212,999 B2 | 5/2007 | Friesen et al. |
| 7,218,325 B1 | 5/2007 | Buck |
| 7,228,289 B2 | 6/2007 | Brumfield et al. |
| 7,243,083 B2 | 7/2007 | Burns et al. |
| 7,620,586 B2 | 11/2009 | Rosenthal et al. |
| 7,693,780 B2 | 4/2010 | Stearns |
| 7,792,736 B2 | 9/2010 | Wasendorf, Sr. |
| 9,619,839 B2 | 4/2017 | Crist |
| 9,870,590 B2 | 1/2018 | Lutnick et al. |
| 2002/0035534 A1 | 3/2002 | Buist et al. |
| 2007/0078749 A1 | 4/2007 | Burns et al. |
| 2011/0251942 A1 | 10/2011 | Rosenthal et al. |
| 2012/0116847 A1* | 5/2012 | Martorella ............ G06Q 30/06 705/7.36 |
| 2012/0197776 A1 | 8/2012 | Studnitzer |
| 2013/0173445 A1 | 7/2013 | Johnson et al. |
| 2013/0212000 A1 | 8/2013 | Foster, II |

* cited by examiner

500

500

500

500

500

500

500

FACILITATION OF DETERMINISTIC INTERACTION WITH A DYNAMICALLY CHANGING TRANSACTION PROCESSING ENVIRONMENT

REFERENCE TO RELATED APPLICATIONS

This application claims priority to and the benefit as a continuation under 37 C.F.R. 1.53(b) of U.S. patent application Ser. No. 14/801,417, filed Jul. 16, 2015, entitled, "FACILITATION OF DETERMINISTIC INTERACTION WITH A DYNAMICALLY CHANGING TRANSACTION PROCESSING ENVIRONMENT", now U.S. Pat. No. 10,102,579, issued Oct. 16, 2018, the entirety of which is incorporated by reference herein and relied upon.

A financial instrument trading system, such as a futures exchange, referred to herein also as an "Exchange", such as the Chicago Mercantile Exchange Inc. (CME), provides a data transaction processing system which implements a contract market where data items, such as financial instruments, for example futures and options on futures, are transacted/traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current electronic data transaction systems which implement financial instrument trading systems allow traders/users to submit orders and receive confirmations, market data, and other information electronically via terminals/client computers connected to the system via a data communications network, such as the Internet, a private network or a combination thereof. These "electronic" marketplaces are an alternative to pit based trading systems whereby the traders, or their representatives, all physically stand in a designated location, i.e. a trading pit, and trade with each other via oral and hand based communication, referred to as "open outcry" trading. Anyone standing in or near the trading pit may be privy to the trades taking place, i.e. who is trading, what they are offering to trade (price and quantity), and what ultimately trades. Electronic trading systems attempt to replicate the trading pit environment in a marketplace of electronic form. In doing so, electronic trading systems ideally offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

The trading of futures, stocks, bonds and other financial instruments over computer data communications networks has become a very common activity. In many countries of the world, such stocks, bonds and other financial instruments are traded exclusively over such computer networks, completely replacing prior trading systems such as "open outcry" trading in trading pits.

Trading of financial instruments, such as futures contracts, typically requires access to multiple types of associated electronic information. For example, to electronically trade a financial instrument, such as a futures contract, an electronic trader typically would like to know the current state of the market for the instrument, i.e. the current ask/sell prices for the instrument as well as current bid/buy prices for the instrument, the associated quantities available, as well as other relevant "market" information, etc.

As the market for a given financial instrument typically changes in real time as other market participants submit orders to buy/sell and these orders are matched and cleared, for an electronic trader to be successful, the multiple types of associated electronic information, referred to as "market data," should be supplied in real-time to allow the electronic trader to make the appropriate decisions based on the most relevant information before the market changes, e.g. because other traders have placed trades for the same instrument. Such market data is typically displayed in multiple windows of a trading user interface presented on a display screen of a computer terminal or other device used by the electronic trader, via interaction therewith, to both view market information and place orders to trade.

There are however a number of problems with displaying information, such as market data, necessary for electronic trading. These problems generally relate to effective presentation of a large volume of constantly changing information in a manner which allows a user to assess the information, identify advantageous opportunities/conditions, make decisions and execute those decisions in an efficient and accurate manner to implement strategies and take advantage of those advantageous opportunities before conditions change.

There have been attempts to solve some of the problems with GUIs used for electronic trading. For example, U.S. Pat. No. 7,243,083, entitled "Electronic spread trading tool" that issued to Burns, et al. teaches "A versatile and efficient electronic spread trading tool to be used when buying and selling comparable commodities either simultaneously or in conjunction with one another. The spread trading tool involves a method of displaying, on an electronic display device, the market depth of a plurality of commodities including an anchor commodity and a non-anchor commodity, where the method includes dynamically displaying a plurality of bids and asks in the market for the commodities, statically displaying prices corresponding to those plurality of bids and asks, where the bids and asks are displayed in alignment with the prices corresponding thereto, displaying an anchor visual indicator corresponding to and in alignment with a desired price level of the anchor commodity, displaying a price level indicator corresponding to and in alignment with a price level of the non-anchor commodity. Based on an unhedged position, and taking into account the parameters and spread price point values, as determined by the trader, price level indicators are calculated and displayed, which provide a visual representation of where the trader should buy and sell the applicable commodities. The price level for the price level indicator in the non-anchor commodity is determined based upon said desired price level of the anchor commodity. The price level indicator also includes a first visual indicator corresponding to and in alignment with a first price level of the non-anchor commodity and a second visual indicator corresponding to and in alignment with a second price level of the non-anchor commodity."

U.S. Pat. No. 7,228,289, entitled "System and method for trading and displaying market information in an electronic trading environment," that issued to Brumfield, et al. teaches "A system and method for trading and displaying market information along a static axis are described to ensure fast and accurate execution of trades. The static axis, whether is a straight axis or a curved one, can be oriented in any direction. Regardless of how the axis is oriented, a first region may display price levels that are arranged along the static axis. A second region, which overlaps the first region, may display one or more indicators for highlighting one of the price levels associated with the lowest offer and one of the price levels associated with the highest bid. Moreover, a third region, which overlaps the first region, may be included for initiating placement of an order to buy or an order to sell the tradeable object through an action of a user input device. Other overlapping regions may also be displayed so that additional market information may be viewed by a trader.

U.S. Pat. No. 7,218,325, entitled "Graphical display with integrated recent period zoom and historical period context data," that issued to Buck teaches "A system and method are provided for displaying a data series. In one embodiment, a graphical interface is provided including at least one axis that is divided into a plurality of axis regions. Preferably, each axis region uses a different linear scale, and the plurality of axis regions forms a continuous non-linear scale. The graphical interface also displays the data series in relation to the plurality of axis regions, and the data series is plotted in relation to each axis region based on a scale resolution corresponding to each respective axis region."

U.S. Pat. No. 7,212,999, entitled "User interface for an electronic trading system," that issued to Friesen, et al. teaches "A user interface for an electronic trading exchange is provided which allows a remote trader to view in real time bid orders, offer orders, and trades for an item, and optionally one or more sources of contextual data. Individual traders place orders on remote client terminals, and this information is routed to a transaction server. The transaction server receives order information from the remote terminals, matches a bid for an item to an offer for an item responsive to the bid corresponding with the offer, and communicates outstanding bid and offer information, and additional information (such as trades and contextual data) back to the client terminals. Each client terminal displays all of the outstanding bids and offers for an item, allowing the trader to view trends in orders for an item. A priority view is provided in which orders are displayed as tokens at locations corresponding to the values of the orders. The size of the tokens reflects the quantity of the orders. An alternate view positions order icons at a location which reflects the value and quantity of the order. Additionally, contextual data for the item is also displayed to allow the trader to consider as much information as possible while making transaction decisions. A pit panel view is also provided in which traders connected to the pit are represented by icons, and are displayed corresponding to an activity level of the trader."

U.S. Pat. No. 7,127,424, entitled "Click based trading with intuitive grid display of market depth and price consolidation" that issued to Kemp II, et al. teaches "A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left or right across the plane as the market prices fluctuate. This allows the trader to trade quickly and efficiently. The price consolidation feature of the present invention, as described herein, enables a trader to consolidate a number of prices in order to condense the display. Such action allows a trader to view a greater range of prices and a greater number of orders in the market at any given time. By consolidating prices, and therefore orders, a trader reduces the risk of a favorable order scrolling from the screen prior to filling a bid or ask on that order at a favorable price."

U.S. Pat. No. 7,124,110, entitled "Method and apparatus for message flow and transaction queue management," that issued to Kemp II, et al. teaches "Management of transaction message flow utilizing a transaction message queue. The system and method are for use in financial transaction messaging systems. The system is designed to enable an administrator to monitor, distribute, control and receive alerts on the use and status of limited network and exchange resources. Users are grouped in a hierarchical manner, preferably including user level and group level, as well as possible additional levels such as account, tradable object, membership, and gateway levels. The message thresholds may be specified for each level to ensure that transmission of a given transaction does not exceed the number of messages permitted for the user, group, account, etc."

U.S. Pat. No. 7,113,924, entitled "System and method for electronic spread trading in real and synthetically generated markets" that issued to Fishbain teaches "A system and method are provided to analyze synthetic and real markets that offer interchangeable tradeable objects to find market opportunities that a trader may capitalize on. A synthetic market is an electronic market created out of real markets by a computer terminal or gateway. A real market is an electronic market that is offered by an electronic exchange. If a desirable market opportunity is found, the preferred embodiments can take action such as by sending orders to either one of the markets, or by sending orders to both markets. An advantage of the preferred embodiments, among many others, is that they can make "invisible" trading opportunities more readily apparent."

U.S. Pat. No. 6,993,504, entitled "User interface for semi-fungible trading," that issued to Friesen, et al. teaches "A user interface and method are disclosed for providing trading between a plurality of semi-fungible and non-fungible goods. A plurality of book axes are displayed in a single interface, each book axis representing a market for a particular good. Orders for goods are displayed as marks on the axes to display the relative value of the orders. A value axis is provided that relates the value of the goods from each market to each other. Thus, a single interface provides the means to relate the values of different semi-fungible goods. The value axis may be displayed in units of price, or a custom value designated by a user or pre-defined by the interface. Quantity information is represented in the interface through the display of a dimension of an order icon. Precise information about each order is displayed either in a panel view or a popup window."

U.S. Pat. No. 6,938,011, entitled "Click based trading with market depth display" that issued to Kemp II, et al. teaches "A method and system for reducing the time it takes for a trader to place a trade when electronically trading commodities on an exchange, thus increasing the likelihood that the trader will have orders filled at desirable prices and quantities. Click based trading, as described herein and specifically the "Click" and "Dime" methods of the present invention, enables a trader to execute single mouse click trades for large volumes of commodities at a price within a pre-specified range."

U.S. Pat. No. 6,772,132, entitled "Click based trading with intuitive grid display of market depth" that issued to Kemp et al. teaches "A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently."

U.S. Pat. No. 6,766,304, entitled "Click based trading with intuitive grid display of market depth" that issued to Kemp et al. teaches "A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently."

U.S. Pat. No. 6,408,282, entitled "System and method for conducting securities transactions over a computer network" that issued to Buist teaches "The system and method of the preferred embodiment supports trading of securities over the Internet both on national exchanges and outside the national exchanges. The preferred embodiment supports an improved human interface and a continuous display of real-time stock quotes on the user's computer screen. The ergonomic graphical user interface (GUI) of the preferred embodiment includes several functional benefits in comparison with existing on-line consumer trading systems. In the preferred embodiment, the users are subscribers to a securities trading service offered over the Internet. Preferably, each subscriber to this service is simultaneously connected from his own computer to a first system which provides user-to-user trading capabilities and to a second system which is a broker/dealer system of his/her choice. The system providing the user-to-user trading services preferably includes a root server and a hierarchical network of replicated servers supporting replicated databases. The user-to-user system provides real-time continuously updated stock information and facilitates user-to-user trades that have been approved by the broker/dealer systems with which it interacts. Users of the preferred system can trade securities with other users of the system. As part of this user-to-user trading, a user can accept a buy or sell offer at the terms offered or they may initiate a counteroffer and negotiate a trade."

U.S. Pat. No. 5,297,031, entitled "Method and apparatus for order management by market brokers" that issued to Gutterman et al. teaches "There is provided a broker workstation for managing orders in a market for trading commodities, securities, securities options, futures contracts and futures options and other items including: a device for selectively displaying order information; a computer for receiving the orders and for controlling the displaying device; and a device for entering the orders into the computer; wherein the displaying device comprises a device for displaying selected order information about each incoming order, a device for displaying a representation of an order deck and a device for displaying a total of market orders. In another aspect of the invention, there is provided in a workstation having a computer, a device for entering order information into the computer and a device for displaying the order information entered, a method for managing orders in a market for trading commodities, securities, securities options, futures contracts and futures options and the like comprising the steps of: selectively displaying order information incoming to the workstation; accepting or rejecting orders corresponding to the incoming order information displayed; displaying accepted order information in a representation of a broker deck; and selectively displaying a total of orders at the market price."

U.S. Published Patent Application US20020035534, entitled "Method and apparatus for auctioning securities," that was published by Buist, et al. teaches "The present invention is a system and method for conducting an on-line auction of securities. A preferred method of auctioning a security comprises the steps of: transmitting to a plurality of potential bidders information identifying the security, a price range having a maximum price and a minimum price, and a time for the auction; receiving from each bidder an offer price for a number of units of the security; transmitting to bidders information concerning the bids that are received; closing the auction either when offers are received for all units of the security at the maximum price or when a predetermined time has elapsed; and upon closing the auction, allocating units of the security so that all bids at a price in excess of the closing price are filled and all bids at the closing price or less are filled on a first-come, first-served basis."

However, none of these attempts solves all of the problems associated with GUIs used for electronic trading.

DETAILED DESCRIPTION

Figure 1:
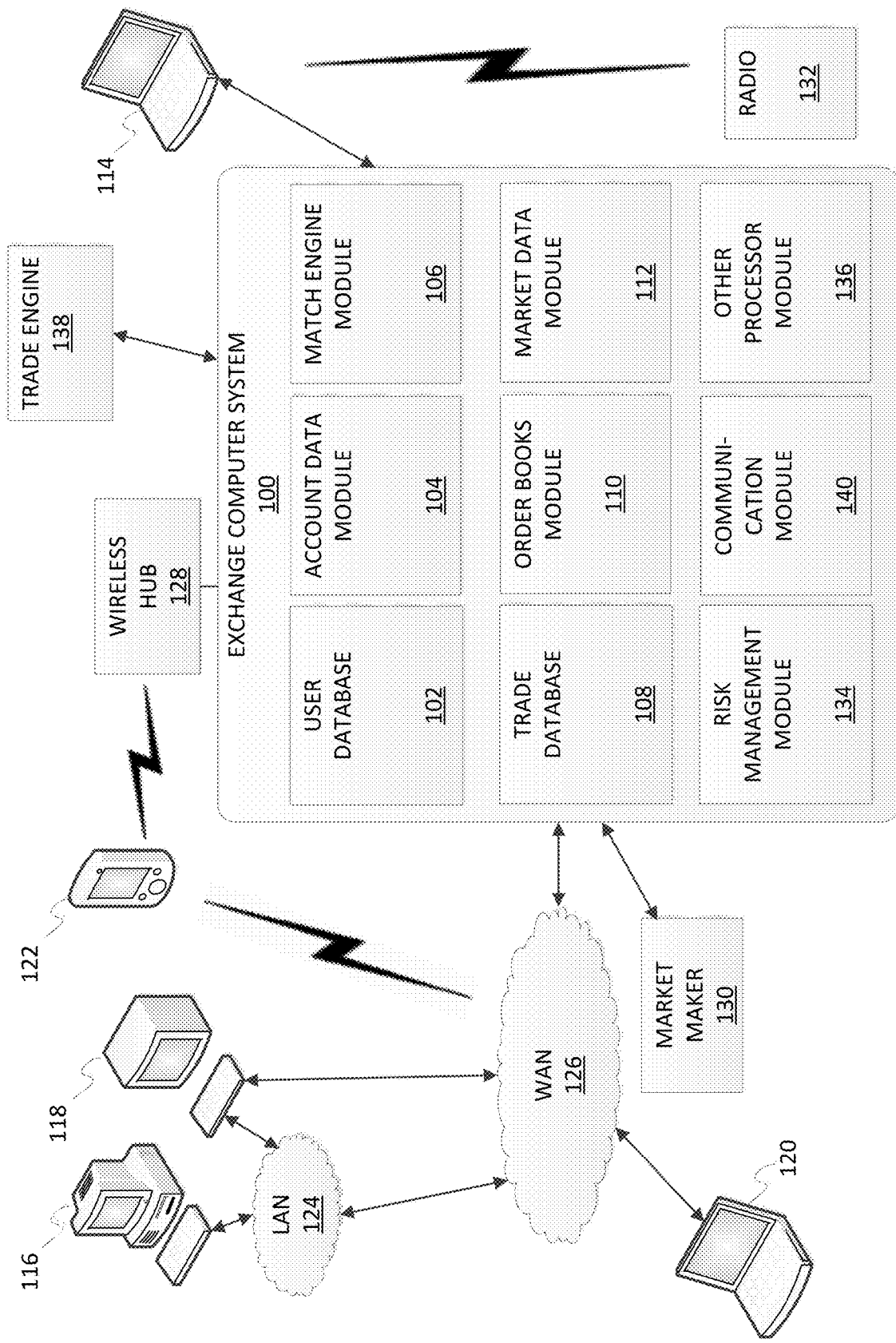
FIG. 1 depicts an illustrative computer network system that may be used to implement aspects of the disclosed embodiments.

The disclosed embodiments relate to ensuring, such as via a system and/or method for operating a user interface and/or via the arrangement and operation of the user interface itself, that a selected value, selected, for example, via interaction with a graphic user interface, of a dynamically changing parameter, such as a price, is used when generating an electronic data transaction request message, such as an order to transact, e.g. trade, a data item, e.g. a financial instrument, based on the selected value in a data transaction processing system, such as an electronic trading system. The data transaction processing system being a system in which data items, such as financial instruments, e.g. futures contracts, are transacted or otherwise traded by a hardware matching processor that attempts to match electronic data transaction request messages with electronic data transaction request messages counter thereto for the same one of the data items based on multiple transaction parameters, e.g. price, quantity, side, specified by the electronic data transaction request messages received from different client computers, e.g. trading terminals, over a data communication network and transmits electronic data transaction result messages to the client computers indicative of the results thereof, each of the electronic data transaction result messages comprising first and second result parameters having values associated therewith, e.g. indicative of available aggregate quantity to buy or sell at an associated price, or data indicative of an update thereto.

As was described above, graphic user interfaces for representing and interacting with dynamically changing market data, i.e. buy/sell prices and available quantities, for a tradeable financial item, e.g. a futures contract, take many forms in order to present the dynamically changing data in a manner which allows a user to assess the market data as well as make and execute decisions with respect thereto. In particular, when a user wishes to place an order at a particular price presented via the interface, some interfaces allow the user to interact with the depicted representation of the price using a user interface device, such as a mouse, in order to place their desired order in an intuitive and efficient manner.

As will be described in more detail below, when traders submit data transaction request messages comprising orders, to buy or sell a particular quantity of a given financial instrument at a particular price to a data transaction processing system, e.g. an electronic trading system, these orders are ultimately received by a hardware matching processor of the data transaction processing system, one embodiment thereof described in more detail below. The hardware matching processor is coupled with a database or other data store, referred to as an order book, which contains data records representative of previously received data transaction request messages comprising orders to buy or sell which were not previously completely satisfied, e.g. unfilled or only partially filled. Generally, the order book lists available quantities to buy or sell at associated prices, also referred to as price levels, and, as will be described, generally represents the current state of a "market" for the transacted item. As will be described, the order book database keeps track of individual unsatisfied data transaction request messages submitted by market participants, e.g., for the purpose of later allocating quantities of matching counter transactions and accounting for completion of those transactions to the particular participants. However, as electronic trading systems typically operate anonymously, only data indicative of aggregate available quantities to buy or sell at particular prices, or indicative of changes thereto, is made available to participants. Of course a market participant is aware of the transactions they themselves submit and the electronic trading system may provide confirmation and/or status data indicative of the status of those transactions specifically to the market participant. As will be used herein, the "inside market" refers to the current best price to buy, e.g. the highest price at which there is available quantity to buy, and the current best price to sell, e.g. the lowest prices which there is available quantity to sell, listed in the order book database, also referred to as the best bid and best ask prices. Further, the term "market depth" may refer to the collection of those prices at which quantities to buy or sell are available. Where there are quantities to buy or sell at a wide range of prices, market depth may further refer to a subset thereof, e.g. a user or system defined range or number of price levels from the inside market, such as the 5 next highest and lowest price levels from the inside market. This may also be referred to as the "visible market depth", while market depth refers to all price levels at which there are available quantities. Market depth and/or visible market depth may comprise discontinuous prices, i.e. a price at which there is no available quantity may not be included in the market depth while adjacent prices, higher and/or lower, having available quantity are included.

For the incoming data transaction request message, the hardware matching processor attempts to determine if one or more of the previously received data transaction requests messages stored in the order book database "match", i.e. is for an order counter, e.g. buy/bid vs. sell/ask/offer or sell/ask/offer vs. buy/bid, to the order of the incoming data transaction request message at the requested, or in some implementations a better, price. If there is no match found, the hardware matching processor creates a new data record in the order book database for the incoming data transaction request message and awaits the next incoming data transaction request message, referred to as "resting the order on the order book". If there is a match found, the hardware matching processor determines how much of the quantity of the order of the incoming data transaction request message is satisfied. If the incoming quantity and the total quantity of the matching one or more data transaction requests from the order book database are equivalent, the matching data transaction requests are removed. If the incoming quantity is less than the total quantity of the matching one or more data transaction requests from the order book database, the data records of the order book database are updated to reflect the unsatisfied remaining quantity of the matching one or more data transaction requests from the order book database, with any fully satisfied data transaction requests being removed from the order book database. When the available quantity exceeds the incoming quantity due to multiple suitable resting orders, the hardware matching processor may determine an allocation of the incoming quantity among those suitable resting orders, such as by satisfying the first received orders first, referred to as "first in first out" or FIFO, or may allocate the incoming quantity proportionally, referred to as "pro rata," or using a combination thereof, until the incoming quantity is exhausted. If the incoming quantity is more than the total quantity of the matching one or more data transaction requests from the order book database, the matching one or more data transaction requests are removed from the order book database and a new data record in the order book database is created to reflect the unsatisfied remainder of the incoming data transaction request, referred to as a "partial fill." Furthermore, traders may submit data transaction request messages comprising order to modify or cancel a previously submitted data transaction request message for an order which has yet to be satisfied, i.e. which is presently listed in the order book database, such as to modify the price and/or quantity of those transactions.

No matter the result, the hardware matching processor then typically generates an electronic data transaction result message, e.g. a market data message, which reflects any changes to the order book database based on the attempt to match the incoming data transaction request message. As will be described, this message may comprise data indicative of the current state of the order book, e.g. a current list of all or a subset of available quantities to buy and/or sell at associated prices (market depth), or may comprise data indicative of a change in all or a subset available quantities available to buy or sell at associated prices. The data transaction result messages are typically broadcast to all market participants via the data communications network and are received by the trader's client device/terminal to be presented via an output interface thereof by the trading software operating thereon, as will be described. Transmitting changes to the order book database may consume less bandwidth than sending the entire market depth but may then require the receiving device to track and apply those changes in order to determine the current state of the order book database.

As data transaction request messages comprising orders to buy or sell at various quantities and at various prices are constantly being received by the data transaction processing system, the order book database is constantly changing with respect to the prices and quantities available for purchase or sale, e.g. the inside market is typically constantly changing, and data transaction result messages indicative of these changes are constantly, i.e. in "real time" relative to those changes, being transmitted in response thereto. "Volatility" typically refers to the frequency or rate of those changes while "volume" typically refers to the magnitude of the changes in available quantity.

As was described above, it is common for trading interface software to depict the state of an order book on the output interface, e.g. display, of a client device, in the form of a grid of cells/rows showing, for each available price, the available quantity to buy or sell.

The vertical display of market information and order entry techniques taught by the patent "Click Based Trading With Intuitive Grid Display of Market Depth" (U.S. Pat. No. 6,772,132), described above, relies upon a static display of prices, aligned either vertically or horizontally, referred to as a ladder, that do not change with the change in the inside market (i.e., the best bid and ask markets together) of the applicable instrument. That is, the prices are listed in rows and the available quantities at each price are displayed in the appropriate row. Given the limitation of the available screen area for showing prices, only a limited number of price rows are displayed, e.g. a limited price range. If there is no available quantity, the price is still shown but no quantity is indicated. Using this interface, a trader may place an order to trade a particular price, generally, by selecting a price depicted on the display using a user interface device, such as a computer mouse to move a pointer on the display over the price level and double-clicking a button on the mouse.

As the order book changes, the display is updated to reflect the quantities available but the prices remain fixed in their depicted position. This causes the market volumes to "climb" up and down the price ladder such that if the price of the instrument is rising or falling continuously there comes a point when, for example, the ask quantities available in the market are not fully visible because the bid volumes have climbed to the top of the ladder, i.e. to the edge of the display/limit of the depicted price range, and only a few ask quantities may be visible.

At some point, the ladder display will receive a "recenter" instruction and the static display of prices in the ladder will recenter such that the current traded price, or inside market, is moved to the middle of the vertical display and the number of ask prices and quantities available will be equal, approximately, to the number of bid prices and quantities available, i.e. the depicted price range will be adjusted to center around the most recent inside market. Recencetering may occur manually or automatically, such as after an elapse of time. However, if prices continue to rise (or fall), this previous situation will reoccur and fewer ask prices and quantities will be visible than bid prices and quantities, until recentering occurs once again. The advantages that are gained from this method of static price display are that prior to a recentering event when the prices are fixed on-screen, a trader will have an ability to click into a row associated with a particular price, or drag and drop an existing order into the row, and be very confident that the order will be entered at that price (i.e., with "price certainty") because, except for recentering events, the price rows are static and there is no chance that a change in market price will impact the price intended on the order or order modification, i.e. the price will level will not move out from underneath the mouse pointer before the trader has chance to double-click. This price certainty of an order is the primary benefit of this static price display However, several problems exist that are the result of the static price display and recentering events. In particular, in order to maintain visibility of the buy and sell quantities available in the market for a given number of market depth, e.g., the 5 best bid prices and quantities and the 5 best ask prices and quantities, the trader must increase the total number of visible static prices to greater than 10, e.g., 20, so that when the bid volumes climb up one row on the ladder, the offer volume associated with the 5th best offer price does not immediately become out of view on the ladder price display. Since the trader needs to display more than 10 rows to be able to continue to see all of the 5 best markets on both the bid and offer sides, this causes the trader to allocate screen surface area to display, for example, the 6th to the 10th best prices above the best 5 offers and the 6th-10th below the 5 best bids even though the trader may not be interested in the 6th to the 10th best bids/offers. As display/screen area is a limited resource, allocating screen surface area to display markets that the trader is not currently interested is undesirable since the trader could use that screen area to display other information, such as a price ladder for another market of interest.

Furthermore, because each trader controls their own display and, in particular, designates when the static price ladder is recentered, when the current market is such that the bid or offer price has moved in one direction, up or down, to the extent that not all 5 of the best bids (or offers) are viewable on screen, the trader is at a disadvantage to one that has devoted more display area to show a larger range of price levels and/or has recently recentered their display and can see all 5 of the best bid (or offer) prices and associated volumes.

If the trader tries to avoid the problem noted above by setting the recentering command to occur more frequently, e.g. whenever the 5th best price would fall off screen, then the trader is disadvantaged because they may want to trade at the time that the recentering occurs and either pick the wrong price due to the recentering or miss his market due to the delay of entering his order due to the recentering. Such problems maybe exacerbated in a volatile market experiencing frequent large price swings while, in a low volatility market, extra price levels may become unnecessary and unused. Further, even if a trader invests in a larger display offering more screen area, there is a still a limit to the field of view of a user, e.g. the amount of information which a user can view and process without excessively moving their head.

The disclosed embodiments provide an interface which combines dynamically changing information with user interactivity in a manner which does not obscure either. The disclosed embodiments allow for depicting and interacting with a market in a manner which minimizes errors in entry and ensures deterministic operation, e.g. an attempt to select a price will result in the intended price being selected, also referred to as "price certainty," while allowing the display to continually recenter keeping the inside market centered and minimizing the display of market depth and consumption thereby of screen area on a display. During the process of selecting a price level to enter a new order or modify an existing order, e.g. by clicking and dragging to a desired price level, the price at the desired level is buffered or otherwise captured for use in a subsequent order, and displayed in a separate indicator such as a hovering tool tip pop up display, when the user releases their mouse, e.g. drops. This eliminates any need to hold ladder/price levels static which eliminates need for display a wide range of price levels and/or periodic, manually or automatically, recentering when orders/volume climb up or down. Further, the disclosed embodiments eliminate the need to show numerous price levels across a range (to provide room for market to move and still be visible and stave off the need to recenter, to keep data (some or all orders) from rolling/climbing out of view), thereby consuming less area of the display of the client device/computer which the user may then use for other purposes. This results in a less distracting and more compact display which maintains the inside market in fixed position, saves/minimizes consumption of display screen real estate, and keeps important information within the field of view of the trader.

In contrast to static price ladders which offer price determinism by fixing the representation of the input parameters, i.e. price values, such that they cannot change prior to a selection, the disclosed embodiments facilitate price determinism/certainty by capturing an intended price value depicted at a selected location on the price ladder and holding that captured price value for use in a subsequent transaction regardless of whether the price value at the location subsequently changes.

FIGS. 5A-5H shows an exemplary interface 500, which may also be referred to as a Market Maker Window or Market Maker Interface, for depicting a market/order book and allowing for trading of a financial instrument according to one embodiment. The interface 500 is meant to be displayed on a computer display coupled with a client device/trading terminal/computer of a trader, such as the display 414 described below with respect to FIG. 4. It will be appreciated that the disclosed embodiments may be implemented by any type of display, now available or later developed. including touch screen displays, mobile device displays, virtual reality displays, etc. Furthermore, interaction with the interface 500 may be accomplished with any one or more user interface devices, or combinations of devices, now available or later developed, such as the user input devices 416 described below with respect to FIG. 4, coupled with the client device/trading terminal/computer, such as keyboards, mice, touch screens, virtual reality input devices, eye tracking devices, etc. or other devices designed to translate user intention into data inputs to the device.

As will be described, the presentation and operation of the user interface 500 may be implemented by the system 200, as described in detail below, which may be implemented via computer program logic stored in a memory and executed by a processor, such as the memory 404 and processor 402 described below with respect to FIG. 4, of the client device or trading terminal used by the user.

The interface 500 includes a first section which comprises a grid of cells 520 and second section 512A, 512B which provides interactive controls which allow a user to set quantities for orders via pre-set "buttons" and/or an input operative to receive an arbitrary quantity value. The grid 520 is arranged vertically into two sets of side by side columns for displaying buy orders 502A and sell orders 502B. It will be appreciated that a horizontal, where the price levels are shown across columns rather than across rows, etc. or other arrangement of the grid of cells 520 may also be used. A number of rows 504A, 504B are provided for depicting market depth or a subset thereof, i.e. prices at which quantities of the financial instrument are available to buy 504A or sell 504B. Each row may be referred to as a market depth or the collection of rows may be referred to as a market depth or visible market depth. The number or rows, e.g. the degree of visible market depth may be configurable or may be fixed. In the exemplary screen displays of FIGS. 5A-5H, the market depth is 5, i.e. the 5 best bid and the 5 best ask price levels are displayed as will be described and any market depth for prices outside of the best 5 are not displayed (but as described herein may be stored by the interface 500/system 200). In one embodiment, as depicted in the figures, the inside market 522 is always shown in the middle rows of the grid 520 with the remaining visible market depth extending equally up or down (depending on the sort/arrangement) therefrom though in an alternate embodiment, the display may be configured, by the user or by the interface designer, asymmetrically to show more market depth for bids over asks or vice versa. The displayed prices of adjacent price levels may be discontinuous, i.e. if there is no available quantity at a particular price, then that price is not shown and, instead, the next best price having available quantity is shown. In this manner, the display may always show the nth best prices in the market having available quantity, where n is the configured or preset market depth. The bid side 502A and offer/ask side 502B columns each include a column showing the pending aggregate quantity for any orders submitted by the trader operating the interface 500, labeled "My Qty" 506A, 506B, a column showing the total aggregate available quantity, which includes the trader's own quantity plus the total available quantity due to orders placed by other traders labeled "Qty" 508A, 508B, and a column indicating the price corresponding to the available quantity labeled "Bid" or "Ofr" 510A, 510B. Herein the terms offer (or ofr) and ask may be used interchangeably to refer to offers to sell. In one embodiment, the rows are collectively sorted or otherwise arranged by the displayed prices in the bid and ask columns in ascending or descending order. As ask prices for available quantities will always be higher then bid prices (unless the order book is crossed), this has the effect of stacking the rows corresponding to available ask quantity 504B on top or below the rows corresponding to available bid quantity 504A as shown in the figure. In an alternate embodiment, the arrangement/sort order of the ask rows (or the bid rows) may be configured, by the user or fixed, to be reversed which may have the effect of collapsing the bid and ask rows such that available bid quantity and available ask quantity appear side by side with the inside market appearing in the top row (not shown). This may be referred to as a "top of book" arrangement. The quantity controls 512A, 512B allow a user to define a preset (by pressing one of the defined "buttons") or arbitrary quantity (by adjusting a variable value input or keying in a specific number) value for use in a subsequently placed trade order as will be described. While the disclosed embodiments will be described with respect to dynamically changing prices and price levels, it will be appreciated that the disclosed embodiments may be applicable to other implementations where a different dynamically changing parameter forms the bases of a user's interact, such as available quantity or some other measure of value or risk, e.g. delta, i.e. a ratio of change in price of an underlier to the corresponding change in a derivative instrument based thereon, or other measure of a financial instrument now known or later developed, such as other "greeks', i.e. measures of risk such as Theta, Gamma, Vega or Rho wherein Theta represents the rate of change between an option portfolio and time, or time sensitivity, Gamma represents the rate of change between an option portfolio's delta and the underlying asset's price—in other words, second-order time price sensitivity, Vega represents the rate of change between an option portfolio's value and the underlying asset's volatility—in other words, sensitivity to volatility and Rho represents the rate of change between an option portfolio's value and the interest rate, or sensitivity to the interest rate.

In operation, as will be described in more detail below, as electronic data transaction result messages are received by the system operating the depicted user interface 500 representing changes to the order book database due to operation of the hardware matching processor, as described above, for the financial product, the display 500 is updated. Updates to the data displayed by the interface 500 in response to receipt of a data transaction result message, as those messages are received, may be referred to as occurring in real time. For example, if all available quantity at a particular price is traded, the display 500 may be updated to remove that price level from the display as there is no remaining available quantity at that price. One or more of the other displayed price levels, which still have available quantity, may then be moved (up or down) or otherwise rearranged and/or a new additional price level may be added/inserted, if there is one with available quantity, to maintain the fixed market depth display. For example, if all 100 units at price 72.85 are traded, price level 72.85 would be removed from the display. Price levels 72.84, 72.83, 72.82 and 72.81 would then be moved up as price level 72.84 is now the inside market. Further, as the market depth is configured to be 5 best prices, the next best price having available quantity, e.g. 72.80, would now be displayed. If a result message were received which merely reflected an update to the available quantity, either increasing or decreasing the amount, the quantity value at the associated price level would be updated accordingly on the display 500. This behavior of the display 500 may be characterized as a "static display of best market."

FIGS. 5B-5H depict the operation of the user interface 500 with respect to the placement of orders to trade the financial instrument by the user of the user interface 500, e.g. to place new orders or modify previously submitted orders. While the interactions with the interface 500 by the user will be described with respect to a computer mouse or other pointing device controlling a representation of a pointer/cursor depicted on the display relative to the displayed graphical components of the interface, it will be appreciated, as was described elsewhere herein, that other interactive devices or combinations of devices may be used.

Figure 5A:
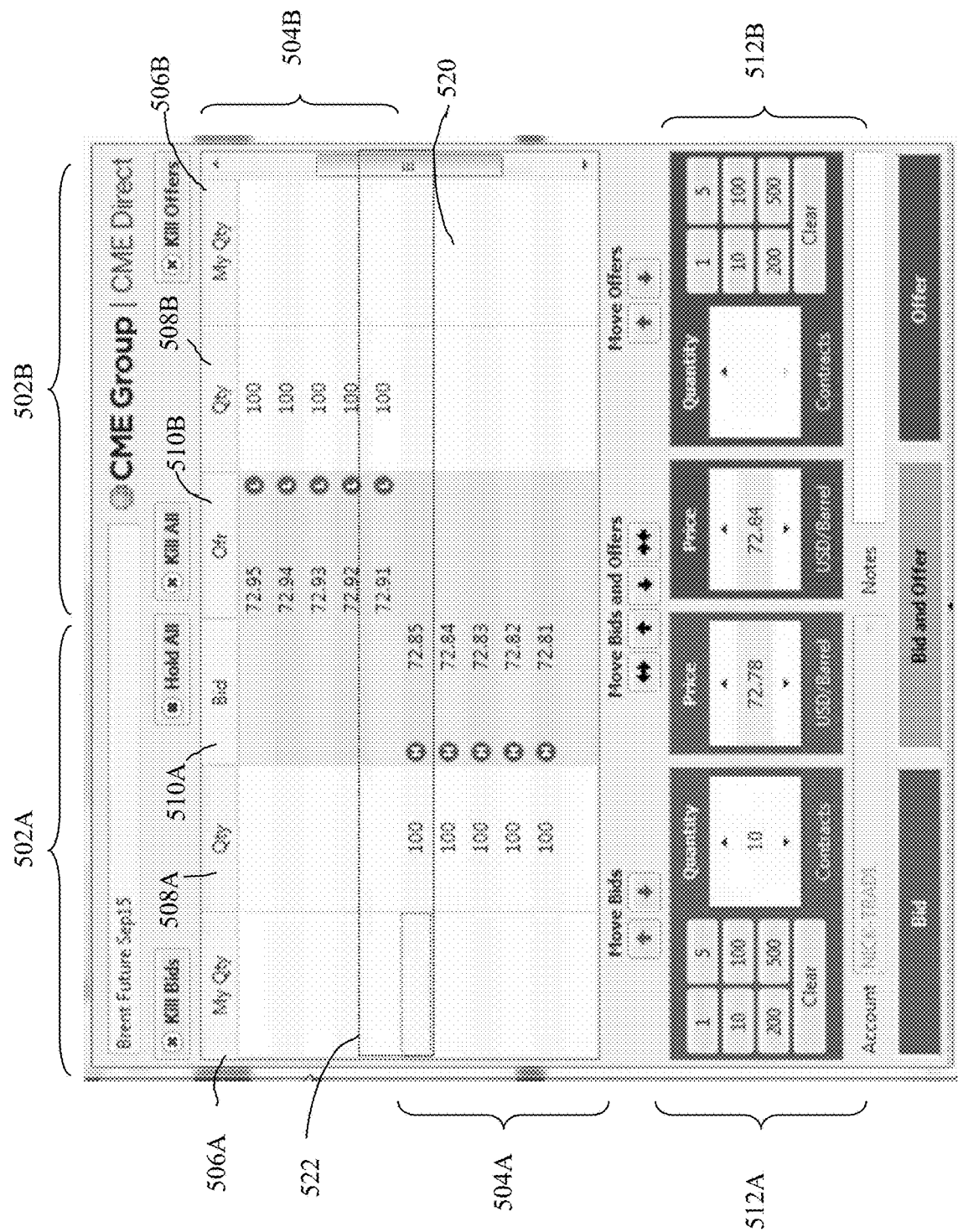
FIG. 5A-5H depicts sample screen displays showing the operation of the system of FIGS. 1-3 according to one embodiment.
Figure 5B:
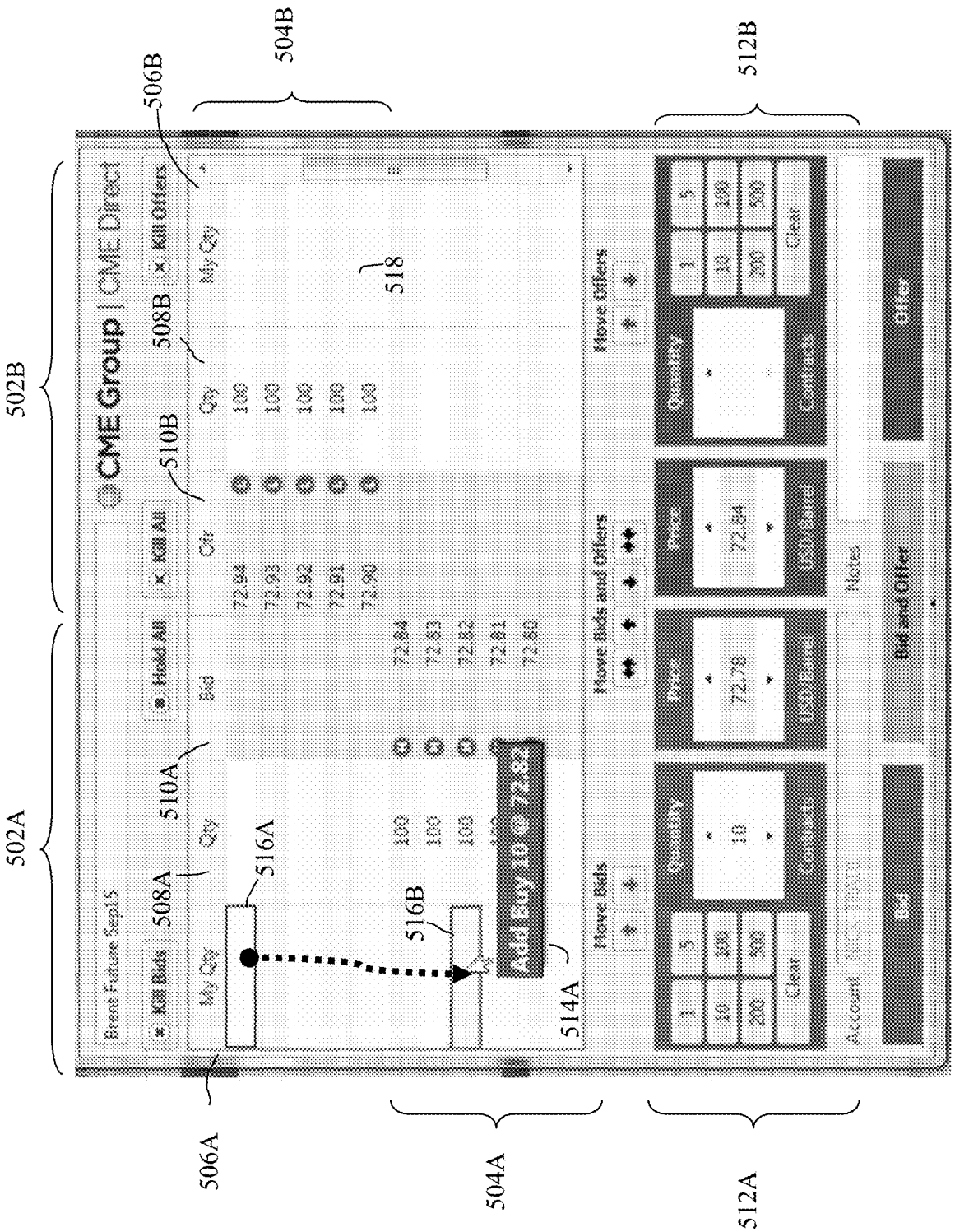

FIG. 5B shows the exemplary interface shown in FIG. 5A as a user selects, by pressing and holding a button on the mouse, an empty cell 516A, i.e. a cell at which no quantity submitted by the user/trader exists, and drags, by moving the mouse while keeping the mouse button pressed, the mouse pointer to a cell 516B at a particular price level, i.e. click (press the mouse button) with the pointer pointed at the blank cell and drag by continuing to hold the mouse button down while moving the mouse pointer to the desired price level 516B. In computer graphical user interfaces, drag and drop is a pointing device gesture, i.e. a way of combining pointing device movements and clicks which the software recognizes as a specific command, in which the user selects a virtual object by "grabbing" it and dragging it to a different location or onto another virtual object. In general, it can be used to invoke many kinds of actions, or create various types of associations between two abstract objects. Dragging requires more physical effort than moving the same pointing device without holding down any buttons. Because of this, a user may not move as quickly and precisely while dragging (see Fitts' law). However, drag-and-drop operations have the advantage of thoughtfully chunking together two operands (the object to drag, and the drop location) into a single action. Dragging may not require the user to hold the mouse button down when certain accessibility options are activated where the computer assumes a single click operation is intended to drag the selected item and a second click is intended to drop it at the new location.

Once user has dragged the mouse pointer to the desired price level 516B, but before they release the mouse button, an indicator 514A is displayed, such as a ghost image, a magnified image, pop up or tool tip, which indicates the price value of the price level to which the user has dragged the mouse substantially at the moment when the mouse pointer arrived at that location. The indicator 514A may be depicted at a position relative to or otherwise corresponding to the particular price level 516B, the position of the mouse pointer, or at some other location which may be fixed on the display or may vary depending upon the position of the price level or mouse pointer. Alternatively, the indicator 514A may be presented in a fixed location within the interface 500 such as at the top or bottom. The indicator 514A may feature a constant portion which displays the price of the price level upon arrival of the mouse pointer and, as will be described, does not change if the price levels subsequently change due to receipt of a market data message indicative of a change in the order book database, and a variable/dynamic portion which changes when the price levels change such as, for example, to indicate that the price levels have changed and that the value shown in the indicator no longer equals the value of the price level at which the mouse pointer is positioned, as will be described in more detail below. It will be appreciated that the indicator 514A may further indicate other information such as the current quantity and type (buy or sell, new order or order move/modification) which may be used to formulate a new order or order modification if, as will be described, the user instructs the interface 500 to generate an order. In one embodiment the indicator 514A is displayed immediately upon the arrival of the mouse pointer at the price level 516B. In alternate embodiments, the indicator 514A may not be displayed until the mouse pointer has been moved within the price level 516B by a threshold distance from the boundary thereof, e.g. by more than 2 pixels from the depicted cell boundary, and/or until the mouse pointer has been allowed to rest or loiter within the price level 516B for a threshold amount of time, e.g. 2 milliseconds. As will be described, the user may place an order to trade, i.e. generate a data transaction request message comprising an order to trade the financial instrument by releasing their mouse button at the desired price level 516B. The interface 500 will then generate the data transaction request message having transaction parameters defined thereby. That is, the type of order, i.e. buy or sell, would be defined by whether the user released their mouse button over one of the bid columns 502A or the ask columns 502B and the quantity, since this is a new order, would be defined by the setting of the quantity controls 512A, 512B. As will further be described, the price for the order will be the price shown in the indicator 514A (unless, as described it is modified by the user), regardless of whether an update to the market data has been received between the time the user dragged the mouse pointer into the price level 516B, and the indicator 514 was displayed, and the time they released the mouse button which resulted in the price levels changing, e.g. moving up or down.

Figure 5C:
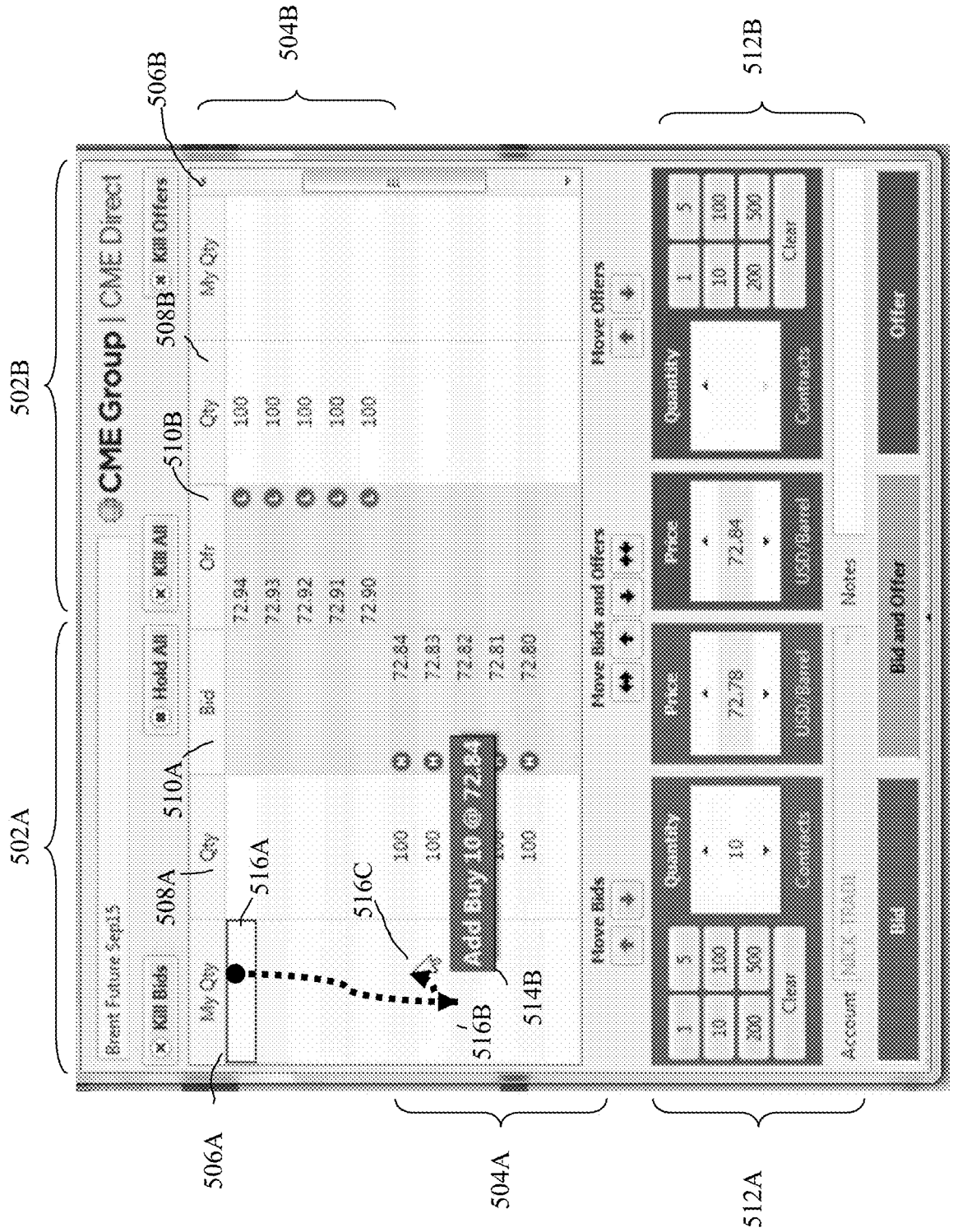

FIG. 5C shows the exemplary interface shown in FIGS. 5A and 5B as a user continues to drag their mouse pointer from one price level 516B to another price level 516C without releasing their mouse button. As can be seen, upon arrival at the new price level 516C, the indicator 514B is updated to show the price at the subsequent price level 516C.

Figure 5D:
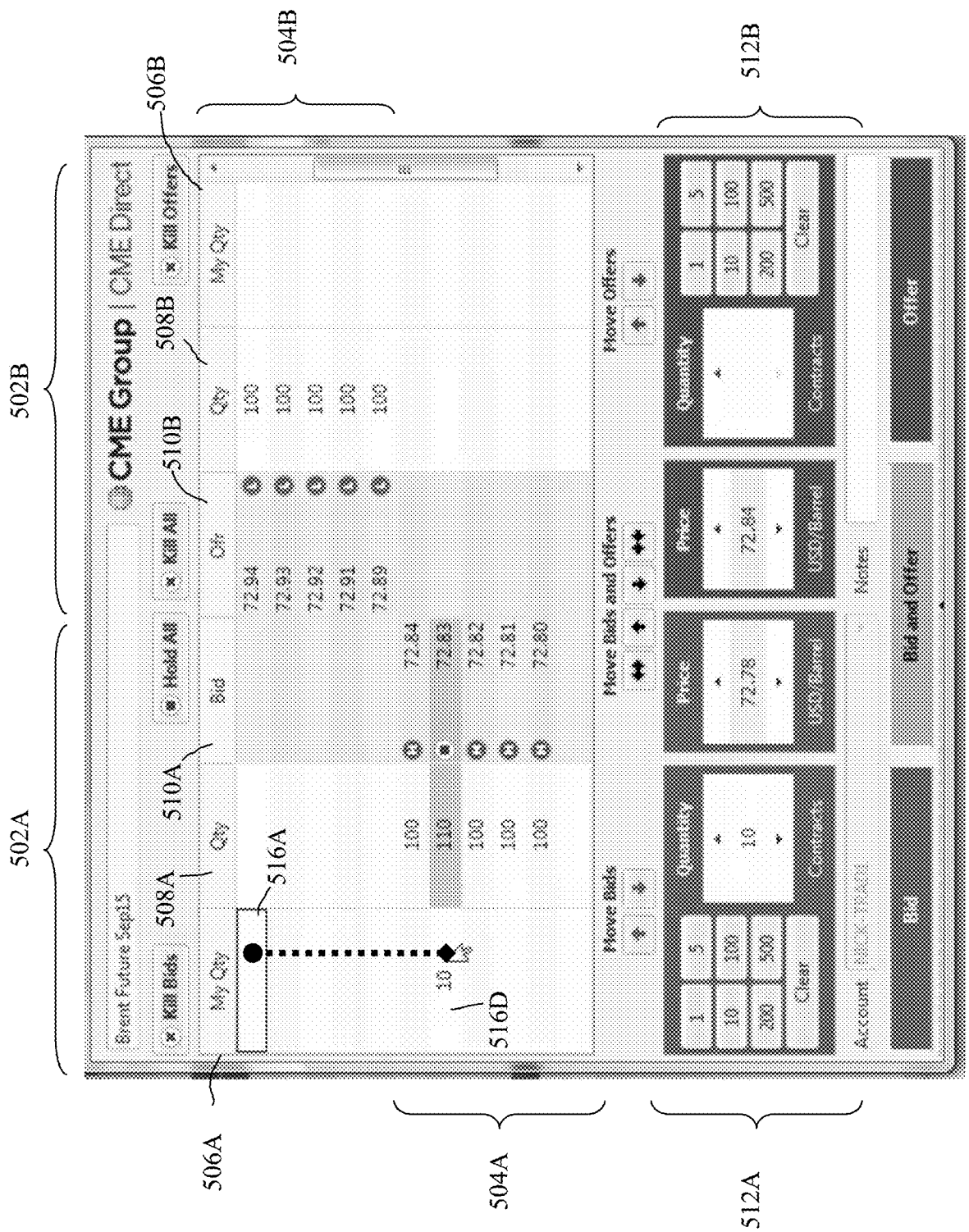

FIG. 5D shows the exemplary interface shown in FIGS. 5A-5C as a user continues to drag their mouse pointer to yet another price level 516D and release their mouse button at that price level 516D to place an order there-at. The "My Qty" column 506A is updated to show the new order placed by the user.

Figure 5E:
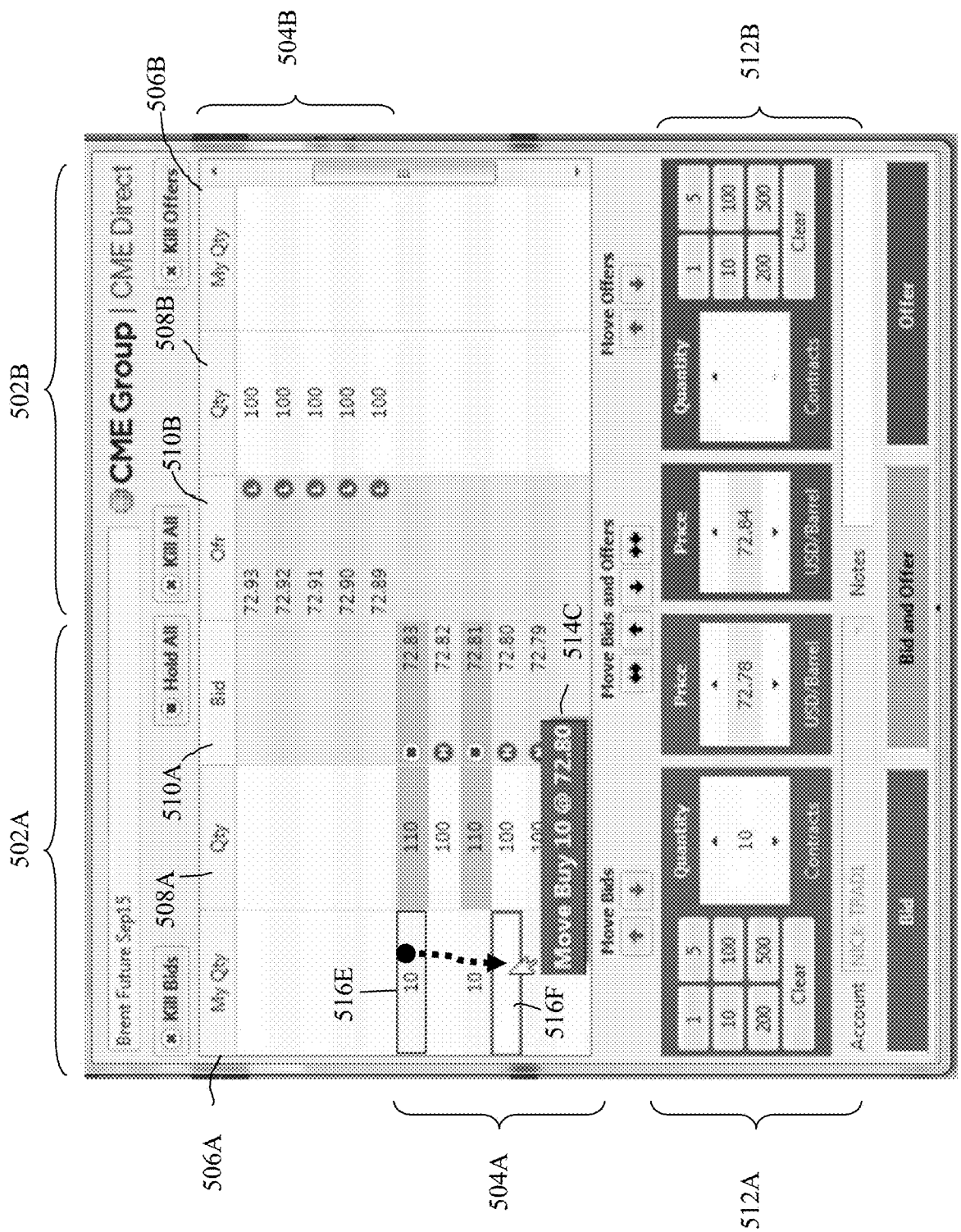

FIG. 5E shows the exemplary interface shown in FIGS. 5A-5D as a user selects a quantity 516E for one or more orders they previously placed and drags the quantity, representative of the previously placed order(s), to a new price level 516F in order to modify/move the price previously placed one or more orders. As shown, upon arrival at the new price level 516F, the indicator 514C is displayed which shows the price value at the price level upon arrival of the mouse pointer, as well as other information related to the action which the interface will take if the user releases their mouse button, e.g. to move the selected quantity to the new price.

Figure 5F:
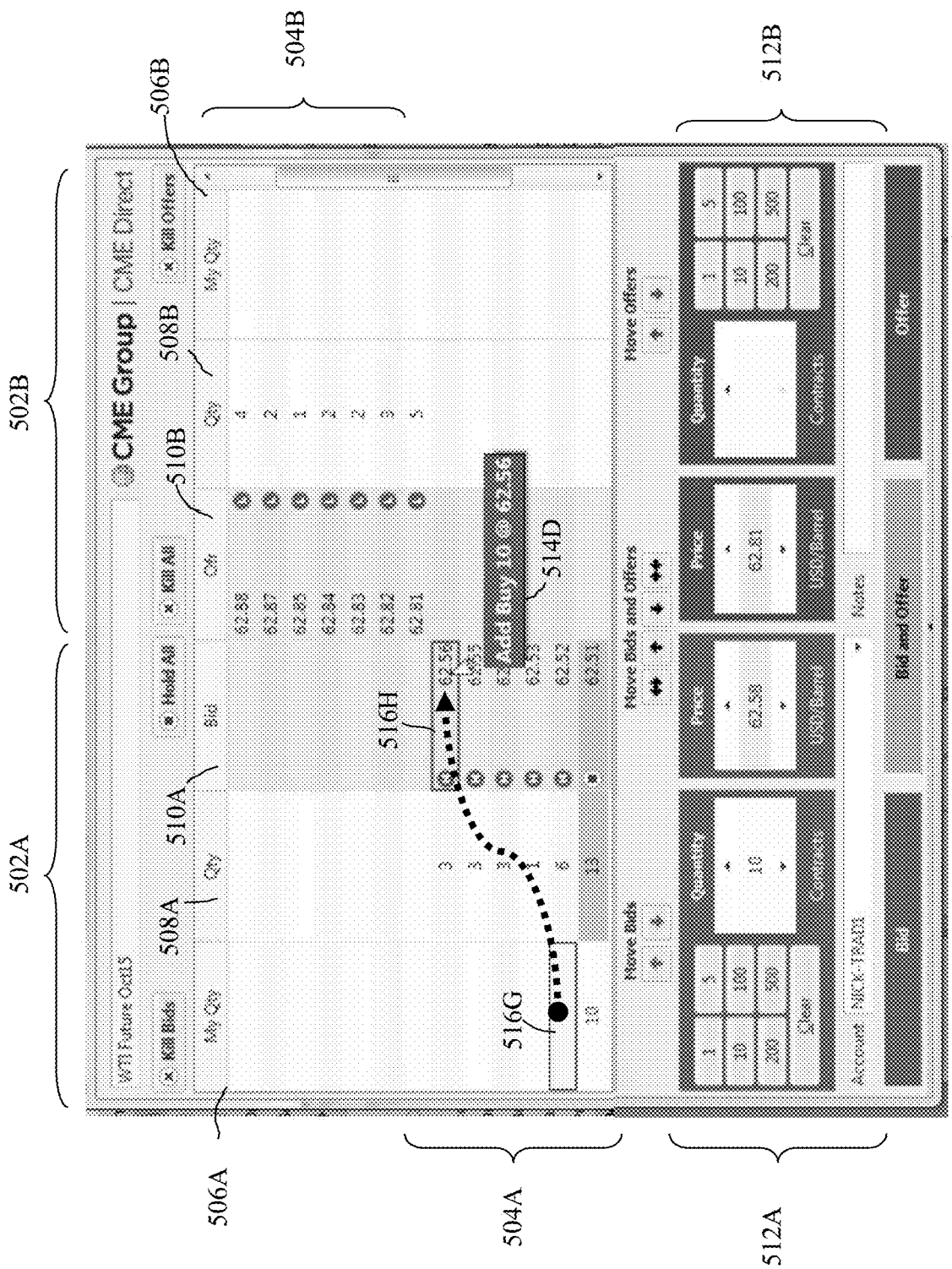
Figure 5G:
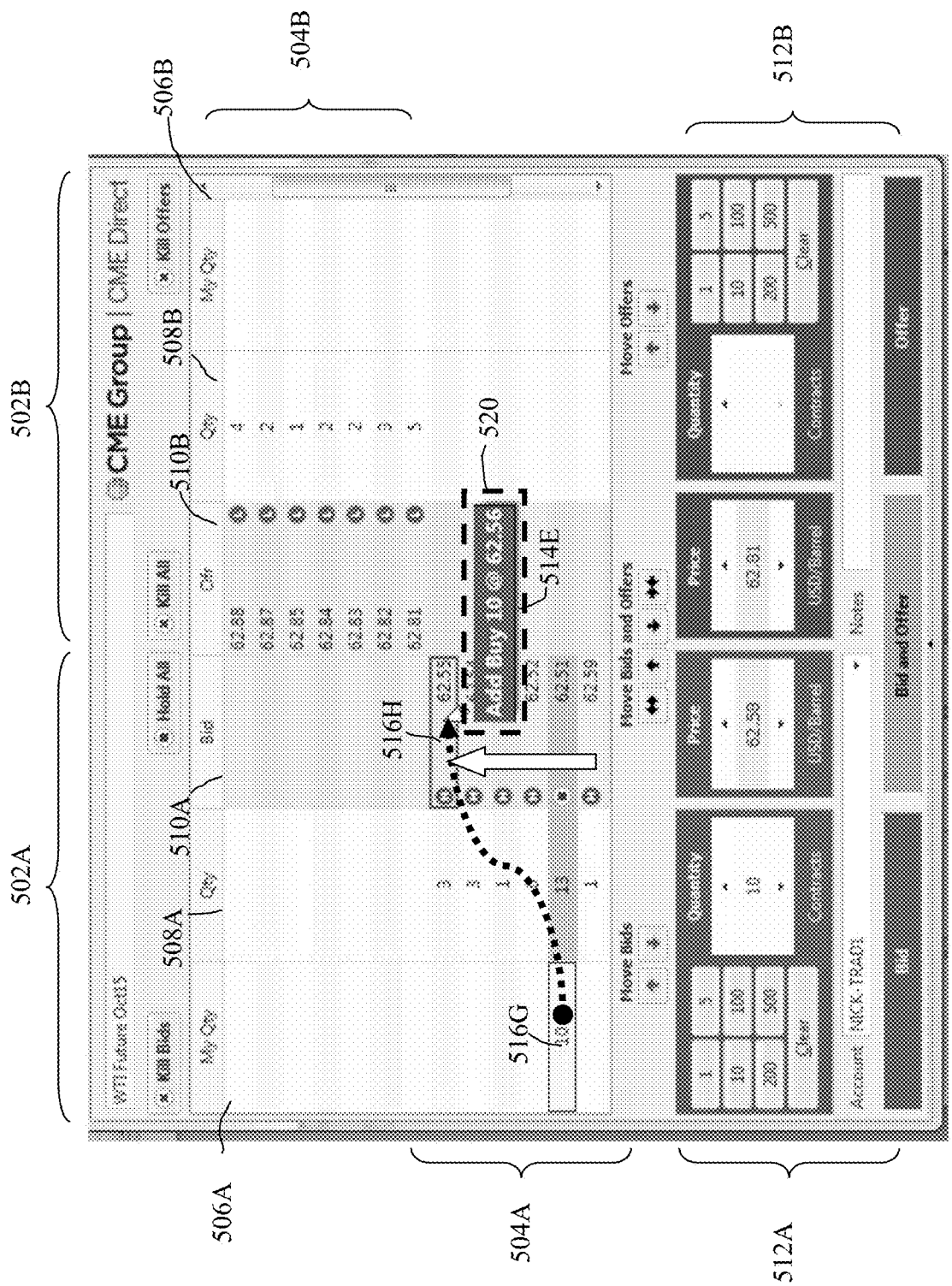
Figure 5H:
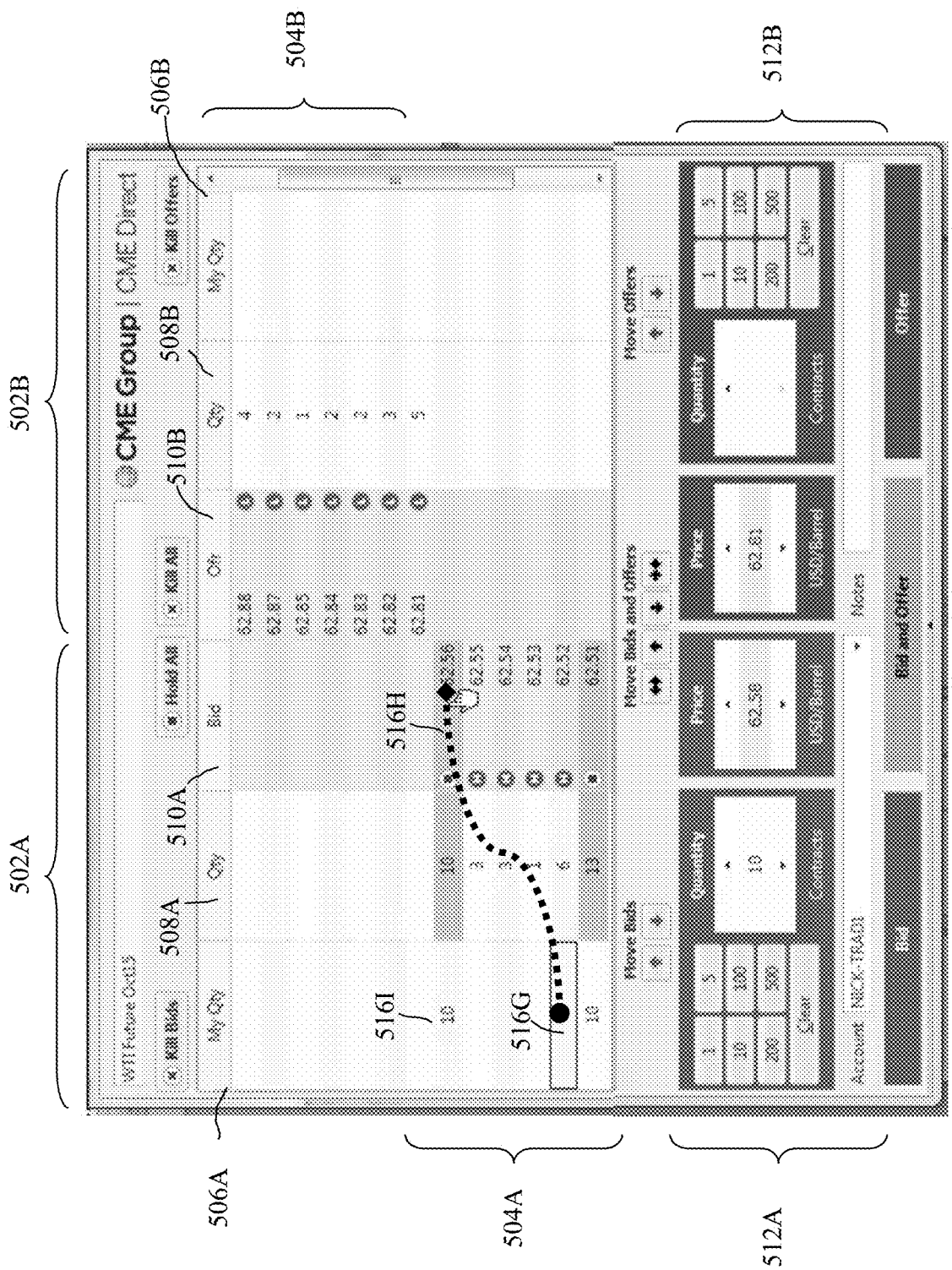

FIG. 5F shows the exemplary interface of FIGS. 5A-5E where, as a user drags their mouse pointer over a particular price level, an indicator 514D, such as a "pop up" or "tool tip" shows the price of the price level (62.56) where the mouse pointer is positioned similar to that shown in FIG. 5B. In FIG. 5F, the user drags the mouse pointer from the empty cell 516G to the price column 510A of the new price level 516H. FIG. 5G shows the exemplary interface of FIG. 5F where, while the user still maintains the mouse pointer positioned over a particular price level 516H, that price level 516H changes due to a change in the depicted order book (to 62.55). However, the indicator 514E, e.g. "pop up" or "tool tip", continues to show the prior price value (62.56) as was shown by the indictor 514D in FIG. 5F and is indicative of the price which will be used in an order if the user releases their mouse button, as shown in FIG. 5H. In one embodiment, the indicator 514E may be altered 520, such as to display in a different color, font, and/or style, or may flash or magnify, or a combination thereof, to indicate when the price displayed in the indicator 514E is different from the price of the price level over which the moue pointer is positioned. As shown in FIG. 5H, the user has released their mouse button over the price level 516H after the price levels had been changed as shown in FIG. 5G. However, the order that was generated was for the price shown in the indicator 514E (6256) which was the price of the price level 516H when, as was shown in FIG. 5F, the mouse pointer arrived at the price level 516H.

In one embodiment, if a user selects a cell on one side 502A, 502B of the interface 500, e.g. the bid side or ask side, and drags the mouse pointer to the opposite side of the interface 500, e.g. from the bid side 502A to the ask side 502B or vice versa, the interface 500 will generate a counter order at the price of the price level upon arrival of the mouse pointer. That is, if the user drags from the bid side 502A to the ask side 502B, a bid order for the available ask quantity at the price level (and the quantity available at any better price levels shown) will be generated. This allows a user to "aggress" and/or "sweep" the market.

In one embodiment, as long as user holds their mouse button down with the pointer positioned over a particular price level, and the corresponding indicator showing the currently selected price and quantity, the user may actuate another user input device, such as a mouse wheel or a key on the keyboard, to modify the price and/or quantity which may be used in a subsequently generated order upon release of the mouse button. In one embodiment, a single user input device, such as a mouse wheel, may be used to modify either the price or the quantity depending on the context of the mouse pointer, e.g. over which column of the price level the mouse pointer is positioned. For example, if the mouse pointer is positioned over the quantity column, actuating the mouse wheel, i.e. rolling it up or down, will adjust the order quantity correspondingly whereas if the mouse pointer is positioned over the price column, actuating the mouse pointer will modify the price.

In one embodiment, to abort a new order or order modification, a user may simply move their mouse pointer off the price grid or to a neutral location and release their mouse button. In one embodiment, dragging existing quantity off the grid may cause the interface 500 to submit an order cancellation for the one or more orders underlying the depicted quantity.

Effectively, the click/drag mouse gesture defines an extended event window (having a defined start and stop), coupled with arrival at a location, to capture the current price shown at a price level and conveys intent to the interface 500 of desire to place an order at a particular price. It will be appreciated that combinations of user interface inputs other than holding a mouse button down while moving the mouse may be used, such as holding a key on a keyboard down while moving a mouse, holding a key on a keyboard down while actuating directional keys on the keyboard, pressing and dragging a finger on a touch screen, etc.

In summary, and with reference to FIGS. 5A-5H, the disclosed interface 500/market maker window (MMW) allows users to amend orders in the following ways. Each item below may be referred to as "MMW Feature #". For example, the first one is "MMW Feature 1":

1. A trader may be able to drag a quantity in MyQty up and down the grid from row to row and from column to column. (Note: this quantity may represent 1 or more orders entered by the trader at that price. This quantity in the MyQty column that may be dragged around the market depth grid may be referred to as an "order" even though the quantity referred to when using "order" may represent the quantities of more than one order.

2. As the trader drags the quantity/order in the MyQty column up and down the grid into the left MyQty, left Qty, Bid, or Offer column, an indicator, tool-tip or similar popup may appear next to the mouse cursor. This tool-tip may display text like 'Buy 100@6' representing the original side (buy/bid or ask/offer/sell), quantity and new price of the order.

3. The price that is displayed in the popup may correspond to the price on the row of the grid at the moment that the order was dragged into it.

4. When the cursor moves into a new row of a new best market level, the popup may not display until the cursor is inside the border by at least 2 pixels.

5. If the price of the row that the trader just moved the MyQty order into changes after the indicator has displayed a price, then the price in the indicator popup may NOT change with any change in the price associated with that row. However the color or text of the tool-tip may change to indicate that the price is no longer consistent with the row position.

6. When the trader releases the left mouse button and "drops" the order into the new price level, it may cause an update to all orders that had the old price to have the new price.

7. If the trader moves his MyQty order from a market level on the bid side to another market level and within either the Bid or Offer column (both are price columns), the indicator may display the price at that row when the cursor entered the row. If, while continuing to hold down the left mouse button and with the order in either price column, the trader additionally spins his mouse wheel up one tick, then the price of the order displayed in the popup will move up one tick, and if the trader spins his mouse wheel down one tick, the price of the order displayed in the popup will move down one tick. To move the price up five ticks from the price level of a row and enter the order modification, the trader would move the order into the appropriate price column of the desired row and, while continuing to hold down the left mouse button, spin the mouse wheel up 5 ticks, view the newly changed price up five ticks from the original price of the row moved into, then release the left mouse button to enter the order.

8. If the trader moves his MyQty order from a market level on the bid side to another market level and within either the left MyQty or left Qty column, the tool tip should display the price at that row when the cursor entered the row. If, while continuing to hold down the left mouse button and with the order in either the left MyQty or left Qty column, the trader additionally spins his mouse wheel up one tick, then the quantity of the order displayed in the popup will move up one quantity unit (quantity unit is set as a trader preference per product), and if the trader spins his mouse wheel down one tick, the quantity of the order displayed in the popup will move down one quantity unit. To move the quantity of the order up five quantity units from the original MyQty quantity, the trader would move the order into the MyQty or Qty column intersecting the desired price row and, while continuing to hold down the left mouse button, spin the mouse wheel up 5 ticks, view the newly changed quantity up five quantity units from the original quantity of the MyQty order, then release the left mouse button to enter the order.

9. If the trader drags an order from the left MyQty column to another price level row and into either the right Qty or right MyQty column, then the indicator may display ("Buy"+"a quantity equal to the aggregated quantity of all best offer markets up to and including the new price level @ the price of the new level at the time the trader entered the order into it"). For example, if the trader drags the order to buy 100@4 to the right Qty column containing 21 in the 2nd best offer price level, currently containing the price of 7, the popup tool-tip should display "Buy 121@7". This feature may enable traders to sweep the market. Similar to how the price in the popup does not change with a subsequent change in the price of the row when the cursor first moved into the row, a change in the quantity of the popup should also not occur when there is a change in the quantity in the market at that market level since the time the popup first appeared. Again, as with underlying price changes, it is desirable to have the popup change color if the quantity at that market level changes from the quantity in the "sweep" order popup.

10. If the trader drags an order as described in MMW Feature 9 and, while continuing to hold down the left mouse button, spins the mouse wheel up/down a number of ticks, then the aggregated volume of the displayed indicator may tick up/down the corresponding number of quantity units as were ticked up/down by the trader.

11. All functionality that has been described for left MyQty orders also applies to right MyQty orders in a similar but opposite side fashion.

As discussed above, the operations described above may be applied to the entry of a new order. What is needed is the ability to generate a quantity and have it display on screen and then drag it to the appropriate market level row exactly as has been previously described. For new orders, the quantity may be set in numerous ways, including utilizing the quantity controls 512A, 512B shown in FIGS. 5A-5H. Continuing the list of Market Maker Window features previously set forth, features for entering a new order may include:

12. After a quantity has been populated into the Bid Quantity box, it may be selectable with a mouse cursor.

13. With the quantity selected in the Bid Quantity box, the user may be able to drag the Quantity into the market depth section of the Market Maker Display and an indicator may be displayed which illustrates that the order is a new order, that it is a buy order and with the quantity and price indicated. The price assigned to the order may be based on the cursor entering the market depth row exactly as taught in the previous MMW features 1-11.

By combining a vertical ladder display that contains a fixed number of best markets with dragging a MyQty order, to amend an order, or with dragging a quantity in the Bid or Offer Quantity box within the Market Maker Order dialog, to create a new order, to a specific market depth level in the vertical market depth display which causes an indicator to display indicating buying or selling the quantity being dragged at the price of the row when the cursor entered the row, a trader is easily able to view all of the best X number of markets simultaneously and continuously in a vertical price format, quickly and easily change the price of an order or enter a new order, both with price certainty, by dropping it into the indicated row without wasting any screen real estate and without the chance of entering an order with an unintended price due to a recentering event.

The disclosed embodiments offer an intuitive vertical view of market depth information that traders like and it combines features that make it easy for a trader to enter or amend an order by dragging a graphical representation of the order, i.e., the popup that illustrates the quantity and price of the order, to a new price level and enter a new order or effect a change to an existing order quickly and easily. The trader has the option to change the price and/or volume of the order by dragging and dropping or dragging, spinning the mouse wheel and dropping. Depending on what type of column the order is dragged to, i.e., a quantity column or a price column, the mouse wheel will allow changes to the popup quantity or price, respectively, and the trader is able to change both quantity and price, in a series of related actions of dragging, spinning and dropping. This process is much quicker than bringing up a modify order dialog and modifying the order by changing values in fields and it has the advantage of the trader being able to view all the displayed best markets at the same time they are changing the price and/or volume of his existing orders or entering a new order.

While the disclosed embodiments may be discussed in relation to presentation of financial related data to participants in an electronic trading system, it will be appreciated that the disclosed embodiments may be used to implement an interface operative to ensure that a selected value, selected, for example, via interaction with a graphic user interface, of a dynamically changing parameter, such as a price or other parameter, is used when generating an electronic data transaction request message in a data transaction processing system.

With respect to the disclosed electronic trading system embodiment, the term "participant" may refer to a trader, clearing member, market participant, or other user of an electronic trading system who interacts with the electronic trading system via a client device/computer, such as a, desktop or mobile trading terminal, computer or other device, via a wired and/or wireless data communications network. The term "message" may refer to electronic data transaction request messages which may comprise orders to trade, e.g. buy or sell, a financial product, or requests to modify or cancel previous orders, as well as electronic data transaction result messages which comprise the responses thereto, as will be described. However, it will be appreciated that a participant may be any user of a communications system, or may refer to a device used by such as user, and a message, whether requests or responses thereto, may be for any purpose, as described herein.

Further, while the disclosed embodiments may be discussed in relation to futures and/or options on futures trading, it will be appreciated that the disclosed embodiments may be applicable to any equity, options or futures trading system or market now available or later developed. It will be appreciated that a trading environment, such as a futures exchange as described herein, implements one or more economic markets where rights and obligations may be traded via a data transaction processing system in which data items, e.g. data records indicative of futures contracts, are transacted by a hardware matching processor that attempts to match electronic data transaction request messages with electronic data transaction request messages counter thereto for the same one of the data items based on multiple transaction parameters specified by the electronic data transaction request messages received from different client devices/computers over a data communication network and transmits electronic data transaction result messages to the client computers indicative of the results thereof.

As such, a trading environment may be characterized by a need to maintain market determinism, integrity, transparency, predictability, fair/equitable access and participant expectations with respect thereto. For example, an exchange must respond to inputs, such as trader orders, cancellation, etc., in a deterministic manner, i.e. in a manner as expected by the market participants, such as based on market data, e.g. prices, available counter-orders, etc., to provide an expected level of certainty that transactions will occur in a consistent and predictable manner. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g. that deterministic and predictable system responses are maintained.

As used herein, a data transaction message, also referred to as an electronic data transaction message, refers both to messages communicated by users, e.g., market participants, to a data transaction processing system of an electronic trading system (data transaction request messages) and vice versa (data transaction result messages). Data transaction messages communicated to the electronic trading system, also referred to as "inbound" messages, may include request or order messages, such as trader orders, order modifications, order cancellations and the like, as well as other message types and may be referred to herein as data transaction request messages. Data transaction messages communicated from the electronic trading system, referred to as "outbound" messages, may include messages responsive to inbound messages, such as confirmation or acknowledgment messages, or other messages such as market update messages, quote messages, and the like, and may be referred to herein as data transaction result messages.

Data transaction messages may further be categorized as having, in the case of request messages, or reflecting, in the case of result messages, an impact on a market or electronic marketplace, also referred to as an "order book" or "book," for a traded product/financial instrument, such as a prevailing price therefore, number of resting orders at various price levels and quantities thereof, etc., or not having or reflecting an impact on a market or a subset or portion thereof. For example a request to place a trade may result in a response indicative of the trade either being matched with, or being rested on an order book to await, a suitable counter-order. This response may include a message directed solely to the trader who submitted to the order to acknowledge receipt of the order and report whether it was matched, and the extent thereto, or rested. The response may further include a message to all market participants reporting a change in the order book due to the order. This response may take the form of a report of the specific change to the order book, e.g. an order for quantity X at price Y was added to the book (referred to as a Market By Order message), or may simply report the result, e.g. price level Y is now has 5 orders for a total quantity if Z (where Z is the sum of the previous resting quantity plus quantity X of the new order) (referred to as a Market By Price message). In some cases, requests may elicit a non-impacting response, such as temporally proximate to the receipt of the request and then cause a separate market-impact reflecting response at a later time. For example, a stop order, fill or kill order, aka an immediate or cancel order, or other conditional request may not have an immediate market impacting effect, if at all, until the requisite conditions are met. Accordingly, an acknowledgement or confirmation of receipt, e.g. a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" or Market By Order "MBO" format). It will be appreciated that additional conditions may be specified, such as a time or price limit, which may cause the order to be dropped or otherwise canceled and that such an event may result in another non-market-impacting communication instead. As will be described below, in some implementations market impacting communications may be communicated via the data communications network separately from non-market impacting communications, such as via a separate communications channel or feed. It will be further appreciated that various types of market data feeds may be provided which reflect different market or aspects thereof. Market participants may then, for example, subscribe, such as via the interface of their client device, to receive those feeds of interest to them. As market impacting communications tend to be more important to market participants then non impacting communications, this separation may reduce congestion and or noise among those communications having or reflecting an impact on a market or portion thereof. Further more, a particular market data feed may only communicate information related to the top buy/sell prices for a particular product, referred to as "top of book" feed, e.g. only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants. Generally, the disclosed embodiments may be used in conjunction with a restructuring of response messages reflecting market impacting events to reduce redundant data and convey more relevant information about the event to all market participants sooner than less relevant information so that the market participants may comprehend the event more quickly. Furthermore, the disclosed embodiments may be used in conjunction with consolidation of the communication of market impact reflecting response messages, e.g. responsive to inbound messages, with other market impact reflecting messages as will be described. In other implementations, these communications may or may not be further consolidated with non-market impacting messages.

Examples of the various types of market data feeds which may be provided by electronic trading systems, such as the CME, in order to provide different types or subsets of market information or to provide such information in different formats include Market By Order, Market Depth (aka Market by Price to a designated depth of the book), e.g. CME offers a 10-deep market by price feed, Top of Book (a single depth Market by Price feed), and combinations thereof. There may also be all manner of specialized feeds in terms of the content, i.e. providing, for example, derived data, such as a calculated index).

Market data feeds may be characterized as providing a "view" or "overview" of a given market, an aggregation or a portion thereof or changes thereto. For example, a market data feed, referred to as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g. only the top 10 resting buy/sell orders and, thereby, only provide a view of that portion. As used herein, a market impacting request may be said to impact the "view" of the market as presented via the market data feed. An MBP feed may utilize different message formats for conveying different types of market impacting events. For example, when a new order is rested on the order book, an MBP message may reflect the current state of the price level to which the order was added, e.g. the new aggregate quantity and the new aggregate number of resting orders. As can be seen, such a message conveys no information about the resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e. report the result of multiple market impacting events in a single message.

Alternatively, a market data feed, referred to as a Market By Order ("MBO") feed, may convey data reflecting a change that occurred to the order book rather than the result of that change, e.g. that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages carry much more data because they reflect any market impacting change. Furthermore, because specific orders, but not the submitting traders thereof, are identified, other market participants may be able to follow that order as it progresses through the market, e.g. as it is modified, canceled, traded, etc.

It will be appreciated that number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. As such, MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancelation, an order modification, etc., are fairly simple and compact and easily created and transmitted. However, messages, whether MBO or MBP, generated response to market impacting events which are caused by more than one order, such as a trade, may require the transmission of a significant amount of data to convey the requisite information to the market participants. For trades involving a large number of orders, e.g. a buy order for a quantity of 5000 which matches 5000 sell orders each for a quantity of 1, a significant amount of information may need to be sent, e.g. data indicative of each of the 5000 trades that have participated in the market impacting event.

In one embodiment, data transaction messages may be communicated between the client device and the data transaction processing system of the electronic trading system via a wired and/or wireless data communications network using a communications protocol such as the Financial Interchange ("FIX") and/or Fix Adapted for Streaming ("FAST") protocols. It will be appreciated that other communications protocols, such as wireless transmission protocols, now available or later developed, may be used in addition to and/or in lieu of the FIX/FAST protocols and is implementation dependent.

In accordance with aspects of the disclosure, systems and methods are disclosed for operating a user interface on a client device to deterministically and interactively represent a state of a data transaction processing system. The disclosed embodiments are preferably implemented with computer devices and computer networks, such as those described with respect FIG. 4, that allow users, e.g. market participants, to exchange trading information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange. An exemplary trading network environment for implementing a data transaction processing system for trading financial products is shown in FIG. 1. The data transaction processing system includes an exchange computer system 100 which receives electronic data transaction request messages, e.g. orders, and transmits electronic data transaction result messages, e.g. market data related to orders and trades to users, such as via a data communications network, such as wide area network 126 and/or local area network 124 and client devices/computers 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, or N including any one element alone or in combination with one or more of the other elements which may also include, in combination, additional elements not listed. It will be appreciated that the messages described herein may be received simultaneously by market participants, or temporally so close together as to be considered or perceived as being simultaneously received, for example, the difference in their time of receipt is too close to measure or otherwise discriminate among, also referred to as "substantially simultaneously". Accordingly, this may be implementation dependent and depend upon the implemented degree to which time of receipt of a transaction may be measured by the receiver, e.g. based on the implemented number of decimal place or number of bits used to delineate time of receipt, and/or implemented network collision handling mechanisms which arbitrate among multiple transactions, e.g. data packets, headers or the signals indicative thereof, received within a defined time window.

The exchange computer system 100 may be implemented with one or more mainframe, desktop or other computers, such as the computer 400 described below with respect to FIG. 4. A user database 102 may be provided which includes information identifying market participants, e.g. traders and other users of exchange computer system 100, such as account numbers or identifiers, user names and passwords. An account data module 104 may be provided which may process account information that may be used during trades. A match engine module 106 may be included which in includes a hardware matching processor to match bid and offer prices specified in data transaction request messages as will be described, and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices for available quantities as will be described. A market data module 112 may be included to collect market data and prepare the data for transmission to users as electronic data transaction result messages. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

The trading network environment shown in FIG. 1 includes exemplary client/computer devices 114, 116, 118, 120 and 122 which depict different exemplary methods or media by which a computer/client device may be coupled with the exchange computer system 100 or by which a user may communicate, e.g. send and receive, trade or other information therewith. It will be appreciated that the types of computer/client devices deployed by market participants/traders and the methods and media by which they communicate with the data transaction processing system, e.g. the exchange computer system 100, is implementation dependent and may vary and that not all of the depicted computer/client devices and/or means/media of communication may be used and that other computer/client devices and/or means/media of communications, now available or later developed may be used. Each computer/client device, which may comprise a computer 400 described in more detail below with respect to FIG. 4, may include a central processor that controls the overall operation of the computer and a system bus that connects the central processor to one or more conventional components, such as a network card or modem. Each computer/client device may also include a variety of interface units and drives for reading and writing data or files and communicating with other computer/client devices and with the data transaction processing system/exchange computer system 100. Each computer/client device may implement the disclosed embodiments described herein to implement the disclosed interface functionality. Depending on the type of computer device, a user can interact with the computer with a keyboard, pointing device, touch screen, microphone, pen device or other input device now available or later developed.

An exemplary computer/client device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer/client device 114 is further shown connected to a radio 132. The user of radio 132, which may include a cellular telephone, smart phone, or other wireless proprietary and/or non-proprietary device, may be, for example, a trader or exchange employee. The radio user may transmit data transaction request messages comprising orders or other information to the exemplary computer/client device 114 or a user thereof. The user of the exemplary computer/client device 114, or the exemplary computer/client device 114 alone and/or autonomously, may then transmit the electronic data transaction request messages comprising the trade or other information to the exchange computer system 100.

Exemplary computer/client devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer/client devices 116 and 118 may communicate with each other and with other computer and other devices which are coupled with the LAN 124. Computer and other devices may be coupled with the LAN 124 via twisted pair wires, coaxial cable, fiber optics or other wired and/or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the data transaction processing system implemented by the exchange computer system 100 may include one or more market makers 130 which may maintain a market by providing constant bid and offer prices for a derivative or security to the exchange computer system 100, such as via one of the exemplary computer/client devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer/client device 116 may include computer-executable instructions for receiving order information from a user and transmitting that order information to exchange computer system 100. In another example, the exemplary computer/client device 118 may include computer-executable instructions for receiving market data from exchange computer system 100 and displaying that information to a user in accordance with the disclosed embodiments as will be described below.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
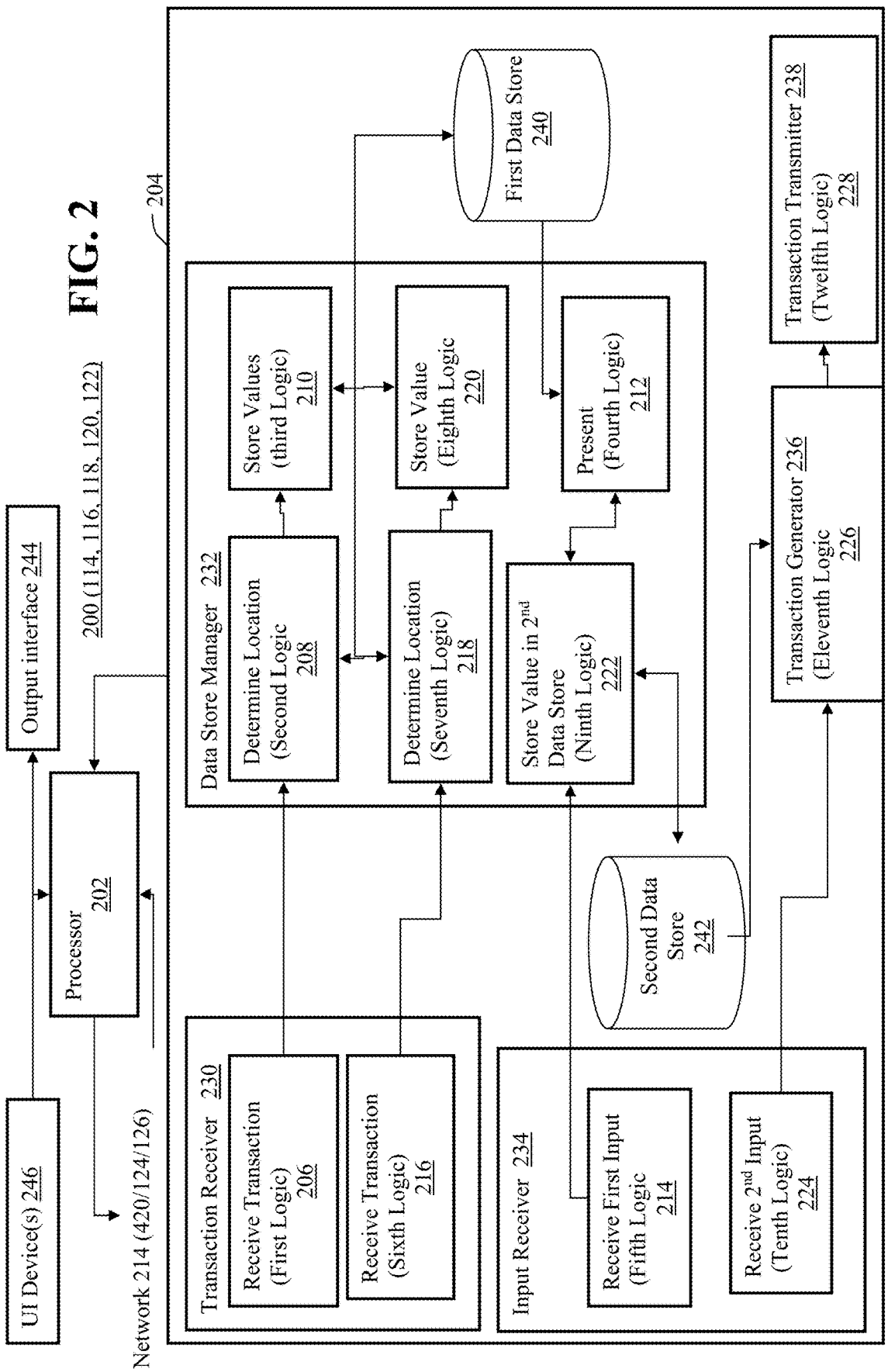
FIG. 2 depicts a block diagram of an exemplary implementation of the system of FIG. 1 for ensuring deterministic selection of a value via an interface.

As shown in FIG. 1, the Exchange computer system 100 includes a communication module 140, match engine module 106, order books module 110 and market data module 112 which may operate in conjunction with the disclosed mechanisms as will be describe with reference to FIG. 2. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 2 depicts a block diagram of a system 200 for ensuring a selected value of a dynamically changing parameter, e.g. price, quantity, delta, etc., is used when generating an electronic data transaction request message in a data transaction processing system, such as an electronic trading system 100, in which data items are transacted by a hardware matching processor, such as of the match engine module 106 described above, that attempts to match electronic data transaction request messages, e.g. orders to trade an financial instrument, with electronic data transaction request messages counter thereto for the same one of the data items based on multiple transaction parameters, e.g. price, quantity, specified by the electronic data transaction request messages received from different client computers/devices, such as the client devices 112, 114, 116, 118, 120, 122, over a data communication network 214, such as the network 420, 124, 126, and transmits electronic data transaction result messages, e.g. market data, to the client computers indicative of the results thereof, each of the electronic data transaction result messages comprising first and second result parameters having values associated therewith, such as price, aggregate remaining quantity (which may be zero), or price and data indicative of a change to previously reported quantity, etc. In one embodiment, the first result parameter comprises data indicative of a price of a data item and the second result parameter comprises data indicative of an available quantity of the data item at the price as a result of previous attempts to match electronic data transaction request messages for the data item previously received by the hardware matching processor 106 of the data transaction processing system 100.

The system 200 may be implemented by any of the client devices 112, 114, 116, 118, 120, 122 shown in FIG. 1 and may be implemented as a non-transitory computer readable medium having instructions stored therein which, when executed by a processor, cause the processor to operate as disclosed.

In particular, the system 200 includes a transaction receiver 230 which is operative to, or may be implemented by first logic 206 stored in a memory 204 and executable by a processor 202, which may be the processor 402 and memory 404 described below with respect to FIG. 4, to cause the processor 202 to, receive a first electronic data transaction result message, e.g. a market data message, via the data communication network 214, which may be the network 420, 124, 126 described elsewhere herein, indicative of an attempt to match a first electronic data transaction request message by the hardware matching processor of the data transaction processing system, e.g. the matching module 106 of the electronic trading system 100. The data transaction result message may indicate one or more available aggregate quantities, or changes thereto, at one or more price levels. It will be appreciated that the data transaction result message may indicate other parameters in addition to, or in lieu of, quantity and price, such as delta, i.e. a ratio of change in price of an underlier to the corresponding change in a derivative instrument based thereon, other measure of a financial instrument now known or later developed, such as other "greeks', i.e. measures of risk such as Theta, Gamma, Vega or Rho wherein Theta represents the rate of change between an option portfolio and time, or time sensitivity, Gamma represents the rate of change between an option portfolio's delta and the underlying asset's price—in other words, second-order time price sensitivity, Vega represents the rate of change between an option portfolio's value and the underlying asset's volatility—in other words, sensitivity to volatility and Rho represents the rate of change between an option portfolio's value and the interest rate, or sensitivity to the interest rate.

The system 200 further includes data store manager 232 coupled with the transaction receiver 230 and which is operative to, or may be implemented by second logic 208 stored in the memory 204 and executable by the processor 202 to cause the processor 202 to, determine, based on a first value of the first result parameter of the first electronic data transaction result message, a first location in a first data store 240, which may be stored in the memory 204 or in a memory separate therefrom coupled therewith in which to store the first value of the first result parameter and a second value of the second result parameter of the first electronic data transaction result message, the first location being determined based on a relationship, such as an ascending or descending ordering, between the first value and any other values of the first result parameter of previously received electronic data transaction request messages stored in other locations in the first data store 240. The first location in the first data store 240 may be determined based a logical or physical arrangement or ordering therein. In particular, where the first location is determined based on a ordering of price values, as was described above with respect to FIGS. 5A-5H, such as an ascending or descending sort/order, the data, i.e. price values, etc., stored in the first data store 240 may be stored in ordered locations therein in the requisite ordering, i.e. a physical arrangement. Alternatively, the data stored in the first data store 240 may be stored in any location in association with data indicative of the ordering of the data values wherein by altering the ordering data values the ordering of the associated price values may be modified, e.g. reordered, i.e. a logical arrangement. In one embodiment, the locations in the first data store 240 may be implemented using a linked/ordered list data structure where each location is further associated with a pointer data value which identifies or "points" to the next location in the arrangement and wherein data values stored in locations may be inserted or removed from the data structure by modifying the values of the associated pointers. In one embodiment, the first data store 240 may be a display buffer, or a memory coupled therewith, which is used to generate or otherwise render a representation of the first data store 240, such as a representation like that shown in FIGS. 5A-5H and described in more detail below. In one embodiment, the first data store 240 provides a user configurable or pre-defined fixed number of locations, e.g. a fixed number of market depth price levels as described above, in which to store price values, which will be represented by the interface 500 as well as additional locations for storing additional price values which, due to the ordering and limited market depth, are not displayed but may eventually be moved, logically or physically, to a location which is within the limited displayed market depth. It will be appreciated that the number of price levels stored in the first data store 240 and displayed by the interface 500 may be variable and, for example, may vary based on price volatility or transaction volume, e.g. the rate and magnitude of changes, of the underlying financial product, increasing the number of levels in a highly volatile market and decreasing the number of levels when volatility decreases.

Further, in the system 200, the data store manager 232 may be further operative, such as via third logic 210 stored in the memory 204 and executable by the processor 202 to, cause the processor 202 to, store, in the first data store 240 coupled therewith, the first value of the first result parameter and the second value of the second result parameter of the first electronic data transaction result message in the determined first location in the first data store 240 and where if the first value is not the same as any of the other values of first result parameters stored in the first data store 240 and the first location is determined to be the same as one of the other locations, for at least one of the other locations move the other values of the first and second result parameters stored therein to a new location. That is, the new value is logically or physically inserted and the remaining values, if required, are logically or physically rearranged/moved according to the selected sort/arrangement. If the incoming data transaction result message comprises a change to the available quantity of a price level already stored in the first data store 240 then only the quantity value may be updated. If the available locations in the first data store are not all occupied there may be no need to rearrange/resort the stored values at all. As noted above, the rearrangement/re-sorting of the stored price values may be implemented logically via modification to sort parameters stored in association with the price values which indicates the order/arrangement thereof. The sort parameters may be utilized in conjunction with a defined sort order, e.g. ascending or descending, to control the presentation of the stored price values as will be described.

Further, in the system 200, the data store manager 232 may be further operative to, such as via fourth logic 212 stored in the memory 204 and executable by the processor 202 to cause the processor 202 to, present, responsive to the storage of the first value, via an output interface 244 coupled therewith, a user-interactive representation of the first data store 240 depicting at least the locations, as well as the values stored therein, at which values of the first and second result parameters of previously received data transaction result messages are stored in the first data store 240. The presentation may take the form of an interactive sorted grid of cells as described above with respect to FIGS. 5A-5H. It will be appreciated that presentation of the first data store 240 may be continually updated/modified based on the receipt of additional data transaction result messages reflecting changes in the depicted order book database as described above as those changes are stored in the first data store 240, e.g. in real time.

The system 200 may further include an input receiver 234, which may be implemented by fifth logic 214 stored in the memory 204 and executable by the processor 202 to cause the processor 202 to receive a first input from a user via a user interface device 246 coupled with the input receiver 234 or processor 202, the first input indicative of a selection of a location in the first data store 240 of the first value via the user-interactive representation presented via the output interface 244. As described above, the user interface device 246 may comprise a computer mouse, or other input device operative to translate user interaction/intention into data inputs to the processor 202.

In one embodiment, the input receiver 234 may be further operative to allow the user to interact with the user-interactive representation using at least one user interface device 246 coupled with the input receiver 234 and operative to allow the user to indicate a selection of any of the locations of the first data store 240 represented by the user-interactive representation, wherein the first and second inputs comprise first and second operands generated by the at least one user input device 246, wherein the first operand comprises a value indicative of one of a first or second state and the second operand comprises a value indicative of a represented location of the user-interactive representation, the selection of a location being indicated when the first operand value is changed from a value indicative of the first state to a value indicative of the second state and, while, e.g. simultaneously or substantially simultaneously with, the first operand value indicates the second state, changing the value of the second operand from a value indicative of a location other than the selected location to a value indicative of the selected location, and wherein the direction to generate an electronic data transaction request message comprising transaction parameters based on the selected location comprises changing the first operand value from the value indicative of the second state to the value indicative of the first state while the second operand comprises the value indicative of the selected location. For example, the first operand may be indicative of a mouse button press or finger tap/press, e.g. the first state is the button being un-pressed/released and the second state indicates the button is pressed, and the second operand may comprises data indicative of a position or movement, absolute or relative, of the device or a finger. Generally, the second state may be indicative of the user wishing to execute a selection operation. In particular, the combination of the first and second operands is indicative of a gesture by the user with respect to the user interface device 246. It will be appreciated any gestures may be utilized by the disclosed embodiments, such as "drag and drop," i.e. holding a button or key in a particular state while moving a mouse or other input device such as to move a displayed cursor to a particular location on the display and then releasing the button or key when the an appropriate location has been achieved, "click/move/click", i.e. similar to drag and drop but the button or key is released during movement and pressed again upon arrival at the desired location, "press/drag/lift," i.e. similar to drag and drop using a touch screen and a touch gesture by the user to touch the screen, drag their finger to the desired location and lift their finger upon arrival thereat, and "tap/move/tap," i.e. where the user taps a first location on a touch screen, lifts and then moves their finger to tap at the desired location on the touch screen.

In one embodiment, the selection of the location may be further indicated by the maintenance of the second operand having the value indicative of the selected location for a minimum duration, e.g. 2 milliseconds, while the first operand value indicates the second state. Alternatively, or in addition thereto, wherein the selected location is defined by a boundary, such as the cell boundary shown in FIGS. 5A-5H, the selection of a location may be further indicated by positioning of a cursor other indicator of location within a threshold distance of the boundary of a cell, such as by being within the boundary by more than 2 pixels. Such mechanisms may present the system 200 from determining a selected location contrary to the intent of the user.

In one embodiment, as was shown above with respect to FIGS. 5A-5H, the locations depicted by the user-interactive representation may further comprise data indicative of any previously generated and transmitted data transaction request messages, i.e. orders placed by the user of the system 200, comprising transaction parameters based on the first value presented as being stored in the location, and further wherein the location other than the selected location comprises a representation of values of a previously generated and transmitted data transaction request message, the generated electronic data transaction request message comprises a request to modify the previously generated transmitted electronic data transaction request message. As was described above, a user may drag the quantity value shown on the display, representing the quantity of their own orders at a given price level, to a new price level, in order to modify the price of those previously placed orders.

In one embodiment, the input receiver 234 may be further operative to allow the user to modify, using at least one user interface device 246 coupled with the processor, the first value stored in the second data store 242 described below. As was described above, after a user has selected a location/price level, e.g. by dragging their mouse to that price level, but before they direct the system to generate and transmit a data transaction request message, e.g. an order, they may alter the price of the order by actuating, for example, their mouse wheel, or otherwise an alternate input, such as an arrow key on a keyboard, to change the price and/or quantity values of the order to be generated, wherein, as was described, whether the price or quantity is modified is dependent on the context/position of the mouse cursor or other indicator.

Further, in the system 200, the transaction receiver 230 may be further operative to, such as via sixth logic 216 stored in the memory 204 and executable by the processor 202 to cause the processor 202 to, receive, subsequent to the receipt of the first input, a second electronic data transaction result message via the data communication network 214 indicative of an attempt to match another electronic data transaction request message by the hardware matching processor of the data transaction processing system;

Further, in the system 200, the data store manager 232 may be further operative to, such as via seventh logic 218 stored in the memory 204 and executable by the processor 202 to cause the processor 202 to, determine, based on a third value of the first result parameter of the second electronic data transaction result message, a second location, logical or physical as was described above, in the first data store 240 coupled therewith in which to store the third value of the first result parameter and a fourth value of the second result parameter of the second electronic data transaction result message, the second location being determined based on a relationship, e.g. an ascending or descending sort/order or arrangement, between the third value and any other values of the first result parameter of previously received electronic data transaction request messages stored in other locations in the first data store 240.

Further, in the system 200, the data store manager 232 may be further operative to, such as via eighth logic 220 stored in the memory 204 and executable by the processor 202 to cause the processor 202 to store, as described above, in the first data store 240 coupled therewith, the third value of the first result parameter and the fourth value of the second result parameter of the second electronic data transaction result message in the determined second location in the first data store 240 and where if the third value is not the same as any of the other values of first result parameters stored in the first data store 240 and the second location is determined to be the same as one of the other locations, for at least one of the other locations move, e.g. logically or physically, the other values of the first and second result parameters stored therein to a new location, e.g. re-order/rearrange the stored values, logically or physically, as necessary according to the configured sort/arrangement as was described above.

In one embodiment, the data store manager 232 may be further operative to update, subsequent to the storing of the third value of the first result parameter and the fourth value of the second result parameter of the second electronic data transaction result message, the user-interactive representation of the first data store 240 depicting at least the locations at which values of the first and second result parameters of previously received data transaction result messages are stored in the first data store 240 as was described above.

Further, in the system 200, the data store manager 230 may be further operative to, such as via ninth logic 222 stored in the memory 204 and executable by the processor 202 to cause, either immediately upon selection of a location as described above or subsequent to selection upon a determination that the price value at the location is going to be changed, the processor 202 to, store, in a second data store 242 coupled therewith, e.g. a buffer memory, which may be part of the memory 204 or a memory separate therefrom, in response to, and at least subsequent to receipt of, the received first input, the first value of the first result parameter of the first electronic data transaction result message. In one embodiment, the second data store 242, e.g. buffer memory, holds only a single price value, and possible an associated quantity, which is replaced when the user selects, e.g. drags to, a different location by the price value at that location upon arrival. In an alterative embodiment, the second data store 242 may store multiple price values, and associated quantities, and provide a function by which a user may select from among the stored values.

In one embodiment, the data store manager 232 may be further operative to present, via the output interface 244, a representation of the first value stored in the second data store 242. The representation may take the form of a tool tip, pop up, ghost image, or other indicator, as shown in FIGS. 5A-5H described above, displayed in conjunction with, adjacent to, or overlapping with the representation of the first data store 240.

In one embodiment, the data store manager 232 may be further operative to alter, e.g. change the color, font, size, or otherwise the appearance of, the representation of the first value stored in the second data store 242 when the first value stored in the second data store 242 is different from a value stored in the first data store 240 at the location at which the first value was stored prior to the storing, by the processor 202 in the first data store 240, of the third value of the first result parameter and the fourth value of the second result parameter of the second electronic data transaction result message.

Further, in the system 200, the input receiver 234 may be further operative to, such as via tenth logic 224 stored in the memory 204 and executable by the processor 202 to cause the processor 202 to, receive, at least subsequent to the receipt of the second electronic data transaction result message, a second input, e.g. a release of their mouse button as described above, from the user via the user interface device 246 coupled with the processor 202, the second input indicative of a direction to generate an electronic data transaction request message comprising transaction parameters based on the selected location of the first value of the first data store 240 as presented via the output interface 244 and transmit the generated electronic data transaction request message, e.g. via the network 214, to the data transaction processing system. As noted above, the parameters of the generated data transaction request may depend upon the selected location or otherwise the position of the mouse cursor with respect to the representation of the first data store 240. For example, if the user drags a quantity value of their own prior orders to a new price level, the quantity parameter of the new generated data transaction request may be set to the selected quantity, subject to alteration by the user as described above, and the type of order may set to an order modification to alter the price of previously submitted orders. Similarly, the type of order may be set by the location at which the user started to drag and where they released their mouse, e.g. if they drag a quantity or blank cell to a new price level but keep their cursor on the same (bid or ask) side of the displayed grid, a new or modified order may be generated but if they drag to the other side of the grid, e.g. from bid to ask or ask to bid, an aggressing order may be generated, e.g. a buy order when dragged from bid to ask or a sell order when dragged from ask to bid. As was described above, the quantity parameter of the newly generated order may be set based on the originating location of the drag operation, based on the settings of other user interface controls, as were described above, or automatically such as in the case of an aggressing order which may be automatically set to the aggregate quantity available at the selected price level and all quantity of price levels that are better, e.g. to allow a sweep of the market.

The system 200 further includes a transaction generator 236 coupled with the input receiver 234 and the second data store 242, which may be implemented by eleventh logic 226 stored in the memory 204 and executable by the processor 202 to cause the processor 202 to generate the electronic data transaction request message, e.g. an order, comprising one or more transaction parameters based on the first value of the first result parameter of the first electronic data transaction result message as stored in the second data store 242. That is, as opposed to using the price value stored at the selected location in the first data store 240, which may have changed due to receipt of a subsequent data transaction result message, e.g., a market data update, the value is taken from the second data store 242. This ensures price certainty, i.e. that the user's newly generated order uses the price the user intended when they selected the displayed price level, regardless whether that price level subsequently changes.

The system 200 further includes a transaction transmitter 238 coupled with the transaction generator 236, which may be implemented by twelfth logic 228 stored in the memory 204 and executable by the processor 202 to cause the processor 202 to transmit the generated electronic data transaction request message to the data transaction processing system 100 via the data communication network 214. The system 200 may then be further operative to update the displayed interface 500 to reflect the user's pending order/quantity as described above.

In one embodiment each price level may be stored in a separate data structure in the first data store 204 wherein each price level data structure stores the price value and may store additional information such as an identifier of the financial instrument/contract, the side (buy or sell), the available quantity at the price level, an implied price, an implied quantity, and the current quantity of one or more orders placed by the user of the system 200 at the price level. The price level structures for all of the price levels may then be stored in, for example, two array data structures, one for buy/bid price level data structures, referred to as the "bid-stack" and another for ask/sell price level data structures, referred to as the "offerstack," where the size of these arrays corresponds to the maximum market depth made available by the data transaction processing system/electronic trading system 100, e.g. 10 price levels. As the user starts their drag operation (referred to as a OnMouseDownEvent), as described above, the data store manager 230 evaluates the mouse cursor position to determine the relevant price level thereto, as was described. The data store manager 230 then accesses a data structure referred to as an OrderCache which stores an order object for each order placed by the user of the system 200 for the financial instruments, the pricelevel side (buy or sell) and price value, and generates a list from which the total quantity to be moved to a new price is derived/extracted. If this is a new blank order, then this list will be populated only with the new order parameters. When the mouse cursor is moved, the position of the cursor is re-evaluated to determine whether it is now resting over a new PriceLevel, and if so the new price of the new price level is copied into the second data store 242. If the user actuates the mouse wheel, it is similarly determined wheel position has changed, e.g. the starting and ending positions, and potentially adjust the Price or Quantity into second data store 242. Once the user drops, e.g. releases the mouse button, referred to as "OnMouseUpEvent," the system 200 then evaluates whether the mouse cursor is still positioned over a relevant PriceLevel, and if so the system 200 employs an algorithm to Add, Amend or Cancel the List of orders in order to make them conform to the newly chosen Price and Quantity. This may involve creating new orders, amending existing orders or cancelling some of the orders in order to achieve the desired quantity. Note that when reducing the quantity at the PriceLevel, where there are multiple orders, the newest order first may be amended first, in order to maintain the price time priority of the oldest order. Note that when increasing the quantity at the PriceLevel, a new order may be created, in order to maintain the price time priority of the oldest order.

Figure 3:
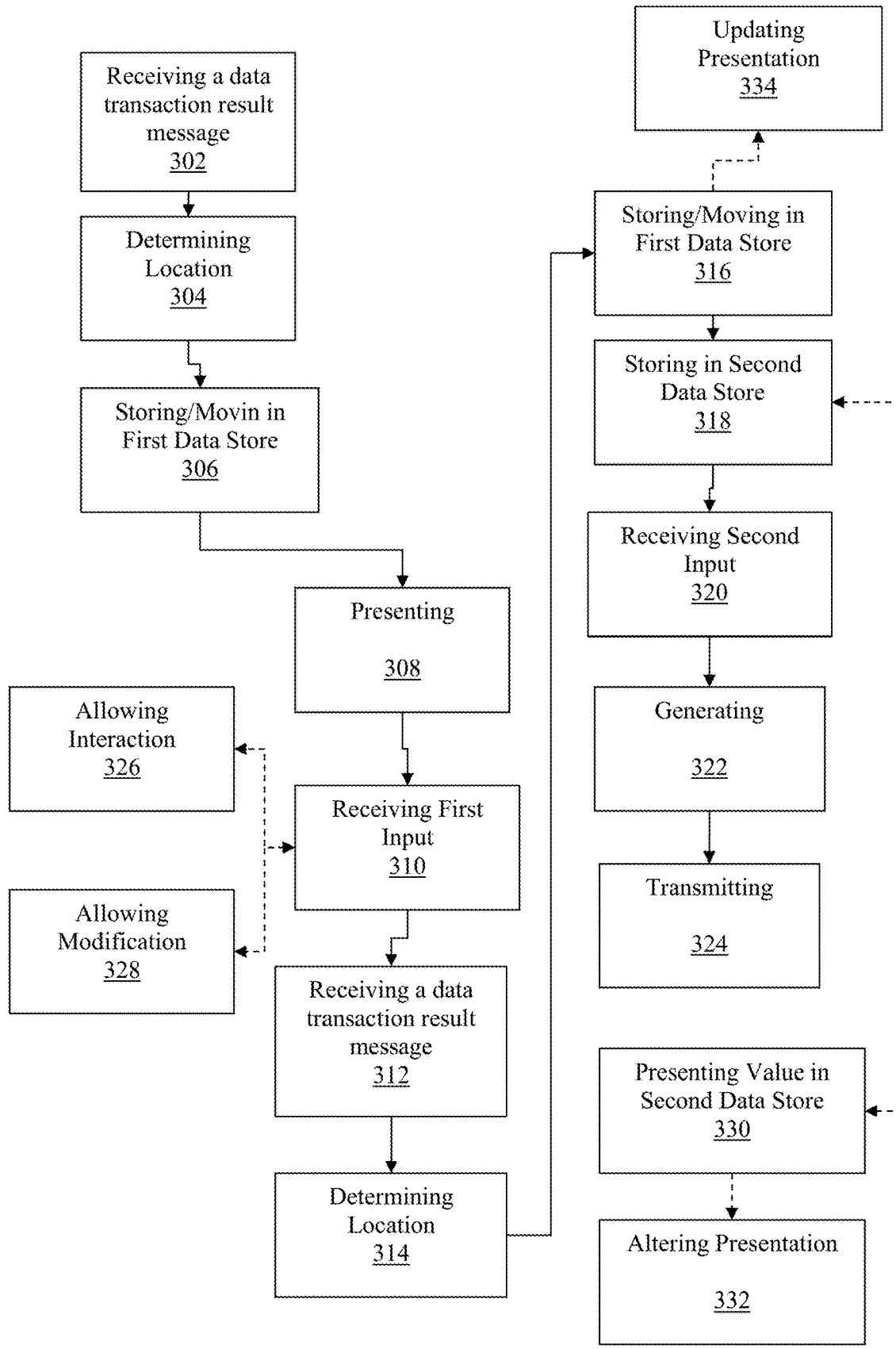
FIG. 3 depicts a flow chart showing operation of the system of FIGS. 1 and 2.

FIG. 3 depicts a flow chart showing operation of the system 200 of FIG. 2. In particular, FIG. 3 shows a computer implemented method of ensuring a selected value of a dynamically changing parameter is used when generating an electronic data transaction request message in a data transaction processing system in which data items are transacted by a hardware matching processor that attempts to match electronic data transaction request messages with electronic data transaction request messages counter thereto for the same one of the data items based on multiple transaction parameters specified by the electronic data transaction request messages received from different client computers over a data communication network and transmits electronic data transaction result messages to the client computers indicative of the results thereof, each of the electronic data transaction result messages comprising first and second result parameters having values associated therewith, such as price, aggregate remaining quantity (which may be zero), or price and data indicative of a change to previously reported quantity, etc. In one embodiment, the first result parameter comprises data indicative of a price of a data item and the second result parameter comprises data indicative of an available quantity of the data item at the price as a result of previous attempts to match electronic data transaction request messages for the data item previously received by the hardware matching processor 106 of the data transaction processing system 100.

The operation of the system 200 includes: receiving, by a processor 202, a first electronic data transaction result message via the data communication network 214 indicative of an attempt to match a first electronic data transaction request message by the hardware matching processor 106 of the data transaction processing system 100 (Block 302). The data transaction result message may indicate one or more available aggregate quantities, or changes thereto, at one or more price levels.

The operation of the system 200 further includes determining, by the processor 202 based on a first value of the first result parameter of the first electronic data transaction result message, a first location in a first data store 240 coupled therewith in which to store the first value of the first result parameter and a second value of the second result parameter of the first electronic data transaction result message, the first location being determined based on a relationship, such as an ascending or descending ordering, between the first value and any other values of the first result parameter of previously received electronic data transaction request messages stored in other locations in the first data store 240 (Block 304). The first location in the first data store 240 may be determined based a logical or physical arrangement or ordering therein. In particular, where the first location is determined based on a ordering of price values, as was described above with respect to FIGS. 5A-5H, such as an ascending or descending sort/order, the data, i.e. price values, etc., stored in the first data store 240 may be stored in ordered locations therein in the requisite ordering, i.e. a physical arrangement. Alternatively, the data stored in the first data store 240 may be stored in any location in association with data indicative of the ordering of the data values wherein by altering the ordering data values the ordering of the associated price values may be modified, e.g. reordered, i.e. a logical arrangement. In one embodiment, the first data store 240 may be a display buffer, or a memory coupled therewith, which is used to generate or otherwise render a representation of the first data store 240, such as a representation like that shown in FIGS. 5A-5H and described in more detail below. In one embodiment, the first data store 240 provides a user configurable or pre-defined fixed number of locations, e.g. a fixed number of market depth price levels as described above, in which to store price values, which will be represented by the interface 500 as well as additional locations for storing additional price values which, due to the ordering and limited market depth, are not displayed but may eventually be moved, logically or physically, to a location which is within the limited displayed market depth. It will be appreciated that the number of price levels stored in the first data store 240 and displayed by the interface 500 may be variable and, for example, may vary based on price volatility or transaction volume, e.g. the rate and magnitude of changes, of the underlying financial product, increasing the number of levels in a highly volatile market and decreasing the number of levels when volatility decreases.

The operation of the system 200 further includes storing, by the processor 202 in the first data store 240 coupled therewith, the first value of the first result parameter and the second value of the second result parameter of the first electronic data transaction result message in the determined first location in the first data store 240 and where if the first value is not the same as any of the other values of first result parameters stored in the first data store 240 and the first location is determined to be the same as one of the other locations, for at least one of the other locations moving the other values of the first and second result parameters stored therein to a new location (Block 306). That is, the new value is logically or physically inserted and the remaining values, if required, are logically or physically rearranged/moved according to the selected sort/arrangement. If the incoming data transaction result message comprises a change to the available quantity of a price level already stored in the first data store 240 then only the quantity value may be updated. If the available locations in the first data store are not all occupied there may be no need to rearrange/resort the stored values at all. As noted above, the rearrangement/re-sorting of the stored price values may be implemented logically via modification to sort parameters stored in association with the price values which indicates the order/arrangement thereof. The sort parameters may be utilized in conjunction with a defined sort order, e.g. ascending or descending, to control the presentation of the stored price values as will be described.

The operation of the system 200 further includes presenting, by the processor 202, responsive to the storing, via an output interface 244 coupled therewith, a user-interactive representation of the first data store 240 depicting at least the locations, at which values of the first and second result parameters of previously received data transaction result messages are stored in the first data store 240 (Block 308). The presentation may take the form of an interactive sorted grid of cells as described above with respect to FIGS. 5A-5H. It will be appreciated that presentation of the first data store 240 may be continually updated/modified based on the receipt of additional data transaction result messages reflecting changes in the depicted order book database as described above as those changes are stored in the first data store 240, e.g. in real time.

The operation of the system 200 further includes receiving, by the processor 202, a first input from a user via at least one user interface device 246 coupled with the processor 202, the first input indicative of a selection of a location in the first data store 240 of the first value via the user-interactive representation presented via the output interface 244 (Block 310). As described above, the user interface device 246 may comprise a computer mouse, or other input device operative to translate user interaction/intention into data inputs to the processor 202.

In one embodiment, the operation of the system 200 further includes allowing, by the processor 202, the user to interact with the user-interactive representation using the at least one user interface device 246 coupled with the processor 202 and allowing the user to indicate a selection of any of the locations of the first data store 240 represented by the user-interactive representation, wherein the first and second inputs comprise first and second operands generated by the at least one user input device 246, wherein the first operand comprises a value indicative of one of a first or second state and the second operand comprises a value indicative of a represented location of the user-interactive representation, the selection of a location being indicated when the first operand value is changed from a value indicative of the first state to a value indicative of the second state and, while, e.g. simultaneously or substantially simultaneously with, the first operand value indicates the second state, changing the value of the second operand from a value indicative of a location other than the selected location to a value indicative of the selected location, and wherein the direction to generate an electronic data transaction request message comprising transaction parameters based on the selected location comprises changing the first operand value from the value indicative of the second state to the value indicative of the first state while the second operand comprises the value indicative of the selected location (Block 326). For example, the first operand may be indicative of a mouse button press or finger tap/press, e.g. the first state is the button being un-pressed/released and the second state indicates the button is pressed, and the second operand may comprises data indicative of a position or movement, absolute or relative, of the device or a finger. Generally, the second state may be indicative of the user wishing to execute a selection operation. In particular, the combination of the first and second operands is indicative of a gesture by the user with respect to the user interface deice 246. It will be appreciated any gestures may be utilized by the disclosed embodiments, such as "drag and drop," i.e. holding a button or key in a particular state while moving a mouse or other input device such as to move a displayed cursor to a particular location on the display and then releasing the button or key when the an appropriate location has been achieved, "click/move/click", i.e. similar to drag and drop but the button or key is released during movement and pressed again upon arrival at the desired location, "press/drag/lift," i.e. similar to drag and drop using a touch screen and a touch gesture by the user to touch the screen, drag their finger to the desired location and lift their finger upon arrival thereat, and "tap/move/tap," i.e. where the user taps a first location on a touch screen, lifts and then moves their finger to tap at the desired location on the touch screen.

In one embodiment, the selection of the location may be further indicated by the maintenance of the second operand having the value indicative of the selected location for a minimum duration, e.g. 2 milliseconds, while the first operand value indicates the second state. Alternatively, or in addition thereto, wherein the selected location is defined by a boundary, such as the cell boundary shown in FIGS. 5A-5H, the selection of a location may be further indicated by positioning of a cursor other indicator of location within a threshold distance of the boundary of a cell, such as by being within the boundary by more than 2 pixels. Such mechanisms may present the system 200 from determining a selected location contrary to the intent of the user.

In one embodiment, as was shown above with respect to FIGS. 5A-5H, the locations depicted by the user-interactive representation may further comprise data indicative of any previously generated and transmitted data transaction request messages, i.e. orders placed by the user of the system 200, comprising transaction parameters based on the first value presented as being stored in the location, and further wherein when the location other than the selected location comprises a representation of values of a previously generated and transmitted data transaction request message, the generated electronic data transaction request message comprises a request to modify the previously generated transmitted electronic data transaction request message. As was described above, a user may drag the quantity value shown on the display, representing the quantity of their own orders at a given price level, to a new price level, in order to modify the price of those previously placed orders.

In one embodiment, the operation of the system 200 further includes allowing, by the processor 202, the user to modify, using at least one user interface device 246 coupled with the processor 202, the first value stored in the second data store 242 (Block 328). As was described above, after a user has selected a location/price level, e.g. by dragging their mouse to that price level, but before they direct the system to generate and transmit a data transaction request message, e.g. an order, they may alter the price of the order by actuating, for example, their mouse wheel, or otherwise an alternate input, such as an arrow key on a keyboard, to change the price and/or quantity values of the order to be generated, wherein, as was described, whether the price or quantity is modified is dependent on the context/position of the mouse cursor or other indicator.

The operation of the system 200 further includes receiving, by the processor 202 subsequent to the receipt of the first input, a second electronic data transaction result message via the data communication network 214 indicative of an attempt to match another electronic data transaction request message by the hardware matching processor 106 of the data transaction processing system 100 (Block 312);

The operation of the system 200 further includes determining, by the processor 202 based on a third value of the first result parameter of the second electronic data transaction result message, a second location, logical or physical as was described above, in the first data store 240 coupled therewith in which to store the third value of the first result parameter and a fourth value of the second result parameter of the second electronic data transaction result message, the second location being determined based on a relationship, e.g. an ascending or descending sort/order or arrangement, between the third value and any other values of the first result parameter of previously received electronic data transaction request messages stored in other locations in the first data store 240 (Block 314).

The operation of the system 200 further includes storing, as described above, by the processor 202 in the first data store 240 coupled therewith, the third value of the first result parameter and the fourth value of the second result parameter of the second electronic data transaction result message in the determined second location in the first data store 240 and where if the third value is not the same as any of the other values of first result parameters stored in the first data store 240 and the second location is determined to be the same as one of the other locations, for at least one of the other locations moving, e.g. logically or physically, the other values of the first and second result parameters stored therein to a new location, e.g. re-order/rearrange the stored values, logically or physically, as necessary according to the configured sort/arrangement as was described above. (Block 316);

In one embodiment, as was described above, the operation of the system 200 may further include updating, by the processor 202 subsequent to the storing of the third value of the first result parameter and the fourth value of the second result parameter of the second electronic data transaction result message, the user-interactive representation of the first data store 240 depicting at least the locations at which values of the first and second result parameters of previously received data transaction result messages are stored in the first data store 240 (Block 334).

The operation of the system 200 further includes storing, by the processor 202 in a second data store 242, e.g. a buffer memory, coupled therewith, in response to, and at least subsequent to receipt of, the received first input, e.g. either immediately upon selection of a location as described above or subsequent to selection upon a determination that the price value at the location is going to be changed, the first value of the first result parameter of the first electronic data transaction result message (Block 318). In one embodiment, the second data store 242, e.g. buffer memory, holds only a single price value, and possible an associated quantity, which is replaced when the user selects, e.g. drags to, a different location by the price value at that location upon arrival. In an alterative embodiment, the second data store 242 may store multiple price values, and associated quantities, and provide a function by which a user may select from among the stored values.

In one embodiment, the operation of the system 200 may further include presenting, by the processor 202, via the output interface 244, a representation of the first value stored in the second data store 242 (Block 330). The representation may take the form of a tool tip, pop up, ghost image, or other indicator, as shown in FIGS. 5A-5H described above, displayed in conjunction with, adjacent to, or overlapping with the representation of the first data store 240.

In one embodiment, the operation of the system 200 may further include altering, e.g. via a change in the color, font, size, or otherwise the appearance, by the processor 202, the representation of the first value stored in the second data store 242 when the first value stored in the second data store 242 is different from a value stored in the first data store 240 at the location at which the first value was stored prior to the storing, by the processor 202 in the first data store 240, of the third value of the first result parameter and the fourth value of the second result parameter of the second electronic data transaction result message (Block 332).

The operation of the system 200 further includes receiving, by the processor 202 at least subsequent to the receipt of the second electronic data transaction result message, a second input, e.g. a release of their mouse button as described above, from the user via the at least one user interface device 246 coupled with the processor 202, the second input indicative of a direction to generate an electronic data transaction request message comprising transaction parameters based on the selected location of the first value of the first data store 240 as presented via the output interface 244 and transmit, e.g. via the network 214, the generated electronic data transaction request message to the data transaction processing system 100 (Block 320). As noted above, the parameters of the generated data transaction request may depend upon the selected location or otherwise the position of the mouse cursor with respect to the representation of the first data store 240. For example, if the user drags a quantity value of their own prior orders to a new price level, the quantity parameter of the new generated data transaction request may be set to the selected quantity, subject to alteration by the user as described above, and the type of order may set to an order modification to alter the price of previously submitted orders. Similarly, the type of order may be set by the location at which the user started to drag and where they released their mouse, e.g. if they drag a quantity or blank cell to a new price level but keep their cursor on the same (bid or ask) side of the displayed grid, a new or modified order may be generated but if they drag to the other side of the grid, e.g. from bid to ask or ask to bid, an aggressing order may be generated, e.g. a buy order when dragged from bid to ask or a sell order when dragged from ask to bid. As was described above, the quantity parameter of the newly generated order may be set based on the originating location of the drag operation, based on the settings of other user interface controls, as were described above, or automatically such as in the case of an aggressing order which may be automatically set to the aggregate quantity available at the selected price level and all quantity of price levels that are better, e.g. to allow a sweep of the market.

The operation of the system 200 further includes generating, by the processor 202, the electronic data transaction request message, e.g. an order, comprising one or more transaction parameters based on the first value of the first result parameter of the first electronic data transaction result message as stored in the second data store 242 (Block 322). That is, as opposed to using the price value stored at the selected location in the first data store 240, which may have changed due to receipt of a subsequent data transaction result message, e.g., a market data update, the value is taken from the second data store 242. This ensures price certainty, i.e. that the user's newly generated order uses the price the user intended when they selected the displayed price level, regardless whether that price level subsequently changes.

The operation of the system 200 further includes transmitting, by the processor 202, the generated electronic data transaction request message to the data transaction processing system 100 via the data communication network 214 (Block 324). The displayed interface 500 may then be updated to reflect the user's pending order/quantity as described above.

Figure 4:
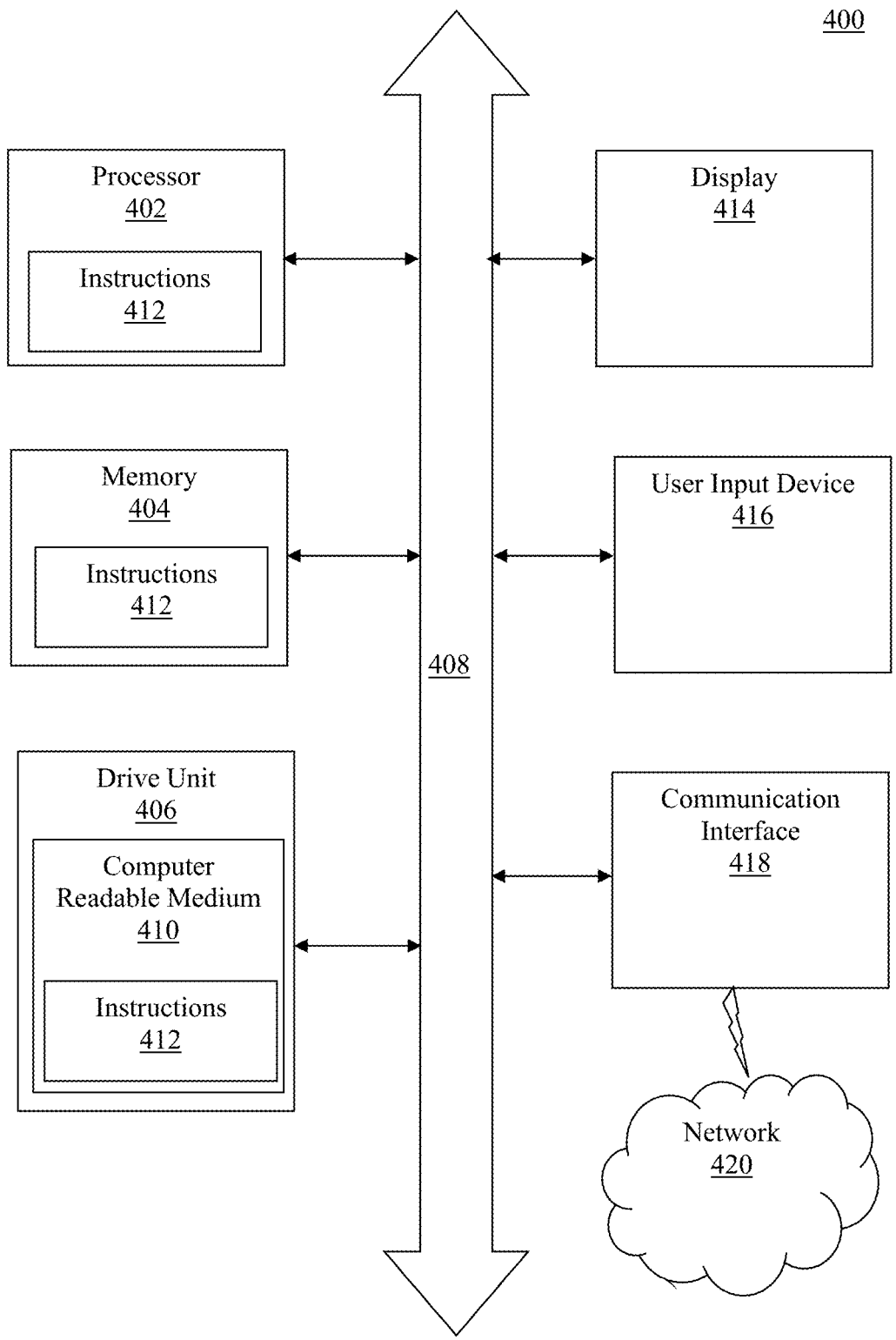
FIG. 4 shows an illustrative embodiment of a general computer system for use with the system of FIGS. 1 and 2.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, content addressable memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for generating a transaction request message comprising a user-selected value associated therewith, said method comprising:
   displaying, by a processor of a computer via a graphical user interface (GUI) presented to the user on a display coupled with the computer, a dynamic display of a plurality of values, each value displayed at a location of the portion of the GUI on the display, wherein the displayed plurality of values periodically changes based on data received from an external data transaction processing system wherein one or more of the plurality of values is displayed at a new location of the portion of the GUI on the display different from a previous location thereof;
   receiving, by the processor, a first one or more inputs provided by the user via one or more user interface devices coupled with the computer, indicative of a first user selection of a first location of the GUI and, subsequent thereto, a second user selection of a second location different from the first location and which corresponds to a location of the GUI at which one of the plurality of values is displayed;
   receiving, by the processor subsequent to the first one or more inputs, a second one or more inputs indicative of a third user selection of the second location; and
   generating, by the processor responsive to the second one or more inputs, a transaction request comprising the one of the plurality of values displayed at the second location upon receipt of the second user selection regardless of whether the displayed plurality of values has changed.

2. The computer implemented method of claim 1, further comprising displaying, by the processor via the GUI subsequent to the receipt of the first one or more inputs and prior to receipt of the second one or more inputs, the one of the plurality of values displayed at the second location upon receipt of the second user selection in a separate indicator which does not change when the displayed plurality of values changes.

3. The computer implemented method of claim 1 wherein the plurality of values comprise price values stored in an order book database of the data transaction processing system in which data items are transacted by a hardware matching processor that attempts to match electronic data transaction request messages with electronic data transaction request messages counter thereto for the same one of the data items based on multiple transaction parameters specified by the electronic data transaction request messages received from different client computers over a data communication network and transmits electronic data transaction result messages to the client computers indicative of the results thereof, the data comprising the electronic data transaction result messages and the generated transaction request comprising an order to transact at the one of the plurality of values displayed at the second location upon receipt of the second user selection.

4. The computer implemented method of claim 3 further comprising displaying, by the processor, via the GUI, an indicator adjacent to each of at least a subset of the displayed plurality of values indicative of a previously generated transaction request for the adjacent value sent to the data transaction processing system.

5. The computer implemented method of claim 4, wherein the first location comprises a value of the plurality of values which has the indicator adjacent thereto, the generated transaction request comprising a request to modify the previously generated transaction request to change the value thereof to the one of the plurality of values displayed at the second location upon receipt of the second user selection.

6. The computer implemented method of claim 4, wherein the first location comprises a value of the plurality of values which has no indicator adjacent thereto, the generated transaction request comprising a new order to transact at the one of the plurality of values displayed at the second location upon receipt of the second user selection.

7. The computer implemented method of claim 3, further comprising displaying, by the processor, first and second regions adjacent to the displayed plurality of values, wherein when the first and second locations are within the first region, the generating further comprises generating the transaction request comprising an order to buy at the one of the plurality of values displayed at the second location upon receipt of the second user selection, and wherein when the first and second locations are within the second region, the generating further comprises generating the transaction request comprising an order to sell at the one of the plurality of values displayed at the second location upon receipt of the second user selection.

8. The computer implemented method of claim 3 further comprising displaying, by the processor, a first and second regions adjacent to the displayed plurality of values, wherein when the first location is within the first region and the second location is within the second region, the generating further comprises generating the transaction request comprising an order to modify a previous order at the one of the plurality of values displayed at the second location upon receipt of the second user selection from a buy order to a sell order, and wherein when the first location is within the second region and the second location is within the first region, the generating further comprises generating the transaction request comprising an order to modify a previous order at the one of the plurality of values displayed at the second location upon receipt of the second user selection from a sell order to a buy order.

9. The computer implemented method of claim 1, wherein the user interface device comprises a mouse having a button, the first one or more inputs comprising data indicative of the button being depressed and held while the mouse position is changed from a first position to a second position and the second one or more inputs comprising release of the button at the second position.

10. The computer implemented method of claim 1, wherein the user interface device is a touch screen, the first one or more inputs comprising data indicative of a user contacting the touch screen at a first position and moving their contact to a second position thereon, the second one or more inputs comprising the user removing their contact at the second position.

11. A system for generating a transaction request message comprising a user-selected value associated therewith, said method comprising:
- a processor and a memory coupled therewith, the system further comprising computer executable program code stored in the memory and executable by the process to cause the processor to:
- display, via a graphical user interface (GUI) presented to the user on a display coupled with the processor, a dynamic display of a plurality of values, each value displayed at a location of the portion of the GUI on the display, wherein the displayed plurality of values periodically changes based on data received from an external data transaction processing system wherein one or more of the plurality of values is displayed at a new location of the portion of the GUI on the display different from a previous location thereof;
- receive a first one or more inputs provided by the user via one or more user interface devices coupled with the computer, indicative of a first user selection of a first location of the GUI and, subsequent thereto, a second user selection of a second location different from the first location and which corresponds to a location of the GUI at which one of the plurality of values is displayed;
- receive, subsequent to the first one or more inputs, a second one or more inputs indicative of a third user selection of the second location; and
- generate, responsive to the second one or more inputs, a transaction request comprising the one of the plurality of values displayed at the second location upon receipt of the second user selection regardless of whether the displayed plurality of values has changed.

12. The system of claim 11, wherein the computer executable program code is further executable by the processor to cause the processor to display, via the GUI subsequent to the receipt of the first one or more inputs and prior to receipt of the second one or more inputs, the one of the plurality of values displayed at the second location upon receipt of the second user selection in a separate indicator which does not change when the displayed plurality of values changes.

13. The system of claim 11, wherein the plurality of values comprise price values stored in an order book database of the data transaction processing system in which data items are transacted by a hardware matching processor that attempts to match electronic data transaction request messages with electronic data transaction request messages counter thereto for the same one of the data items based on multiple transaction parameters specified by the electronic data transaction request messages received from different client computers over a data communication network and transmits electronic data transaction result messages to the client computers indicative of the results thereof, the data comprising the electronic data transaction result messages and the generated transaction request comprising an order to transact at the one of the plurality of values displayed at the second location upon receipt of the second user selection.

14. The system of claim 13, wherein the computer executable program code is further executable by the processor to cause the processor to display, via the GUI, an indicator adjacent to each of at least a subset of the displayed plurality of values indicative of a previously generated transaction request for the adjacent value sent to the data transaction processing system.

15. The system of claim 14, wherein the first location comprises a value of the plurality of values which has the indicator adjacent thereto, the generated transaction request comprising a request to modify the previously generated transaction request to change the value thereof to the one of the plurality of values displayed at the second location upon receipt of the second user selection.

16. The system of claim 14, wherein the first location comprises a value of the plurality of values which has no indicator adjacent thereto, the generated transaction request comprising a new order to transact at the one of the plurality of values displayed at the second location upon receipt of the second user selection.

17. The system of claim 13, wherein the computer executable program code is further executable by the processor to cause the processor to display a first and second regions adjacent to the displayed plurality of values, wherein when the first and second locations are within the first region, and cause the processor to generate the transaction request comprising an order to buy at the one of the plurality of values displayed at the second location upon receipt of the second user selection, and wherein when the first and second locations are within the second region, and cause the processor to generate the transaction request comprising an order to sell at the one of the plurality of values displayed at the second location upon receipt of the second user selection.

18. The system of claim 13 wherein the computer executable program code is further executable by the processor to cause the processor to display first and second regions adjacent to the displayed plurality of values, wherein when the first location is within the first region and the second location is within the second region, wherein the computer executable program code is further executable by the processor to cause the processor to generate the transaction request comprising an order to modify a previous order at the one of the plurality of values displayed at the second location upon receipt of the second user selection from a buy order to a sell order, and wherein when the first location is within the second region and the second location is within the first region, the wherein the computer executable program code is further executable by the processor to cause the processor to generate the transaction request comprising an order to modify a previous order at the one of the plurality of values displayed at the second location upon receipt of the second user selection from a sell order to a buy order.

19. The system of claim 11, wherein the user interface device comprises a mouse having a button, the first one or more inputs comprising data indicative of the button being depressed and held while the mouse position is changed from a first position to a second position and the second one or more inputs comprising release of the button at the second position.

20. The system of claim 11, wherein the user interface device is a touch screen, the first one or more inputs comprising data indicative of a user contacting the touch screen at a first position and moving their contact to a second position thereon, the second one or more inputs comprising the user removing their contact at the second position.

21. A system for generating a transaction request message comprising a user-selected value associated therewith, said system comprising:

- means for displaying, via a graphical user interface (GUI) presented to the user on a display coupled with the computer, a dynamic display of a plurality of values, each value displayed at a location of the portion of the GUI on the display, wherein the displayed plurality of values periodically changes based on data received from an external data transaction processing system wherein one or more of the plurality of values is displayed at a new location of the portion of the GUI on the display different from a previous location thereof;
- means for receiving, a first one or more inputs provided by the user via one or more user interface devices coupled with the computer, indicative of a first user selection of a first location of the GUI and, subsequent thereto, a second user selection of a second location different from the first location and which corresponds to a location of the GUI at which one of the plurality of values is displayed;
- means for receiving, subsequent to the first one or more inputs, a second one or more inputs indicative of a third user selection of the second location; and
- means for generating, responsive to the second one or more inputs, a transaction request comprising the one of the plurality of values displayed at the second location upon receipt of the second user selection regardless of whether the displayed plurality of values has changed.

* * * * *